United States Patent
Kato

(10) Patent No.: US 12,496,989 B2
(45) Date of Patent: Dec. 16, 2025

(54) VEHICLE EXTERNAL COMMUNICATION CONTROL SYSTEM FOR TERMINAL IN VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 154 days.

(21) Appl. No.: 18/625,071

(22) Filed: Apr. 2, 2024

(65) Prior Publication Data

US 2024/0343214 A1 Oct. 17, 2024

(30) Foreign Application Priority Data

Apr. 13, 2023 (JP) .................................. 2023-065568

(51) Int. Cl.
*B60R 16/023* (2006.01)
*H04W 4/40* (2018.01)

(52) U.S. Cl.
CPC ........... *B60R 16/0231* (2013.01); *H04W 4/40* (2018.02)

(58) Field of Classification Search
CPC ...... B60R 16/0231; H04W 4/40; H04W 4/44; H04W 4/024; H04W 4/38; H04W 12/06
USPC .......................................................... 701/2
See application file for complete search history.

(56) References Cited

U.S. PATENT DOCUMENTS

| | | | |
|---|---|---|---|
| 2005/0203682 A1* | 9/2005 | Omino | H04L 67/04 701/24 |
| 2017/0118324 A1* | 4/2017 | Yoganathan | H04W 4/48 |
| 2018/0082587 A1* | 3/2018 | Wan | B60Q 5/006 |
| 2020/0314608 A1* | 10/2020 | Harada | H04W 40/24 |
| 2020/0314609 A1* | 10/2020 | Harada | H04W 4/40 |
| 2021/0092019 A1* | 3/2021 | Fang | H04L 41/28 |
| 2021/0096841 A1* | 4/2021 | Iwata | G06F 13/4027 |

FOREIGN PATENT DOCUMENTS

| | | | |
|---|---|---|---|
| DE | 102021122354 | * | 3/2022 |
| JP | 2005-260469 A | | 9/2005 |
| JP | 2019-216412 A | | 12/2019 |

* cited by examiner

*Primary Examiner* — Muhammad Shafi
(74) *Attorney, Agent, or Firm* — Rimon P.C.

(57) ABSTRACT

A vehicle external communication control system for a terminal(s) in a vehicle controls external communication of the terminal(s) through the vehicle and includes a vehicle internal communicator, a vehicle external communicator, a vehicle external communication controller, a setter, and a server. The vehicle external communication controller is activated in a setting state in which the terminal(s) is unable to communicate with an external device through the vehicle. Upon detecting the terminal(s) present in the vehicle through the vehicle internal communicator, the setter acquires setting data regarding the external communication of the terminal(s) recorded on an individual terminal basis from the server, and makes, on the vehicle external communication controller, a communication setting for the external communication of the terminal(s) on the individual terminal basis using the setting data to enable the external communication of the terminal(s) on the individual terminal basis.

12 Claims, 12 Drawing Sheets

| REGISTERED USER DB | | |
|---|---|---|
| FIRST ADMINISTRATOR | | |
| | USER DATA | |
| | FIRST ADMINISTRATOR NAME | FILTERING: OFF, SEAT SETTING DATA |
| | FIRST USER NAME | FILTERING: OFF, SEAT SETTING DATA |
| | SECOND USER NAME | FILTERING: ON, AIR CONDITIONER SETTING DATA |
| | VEHICLE DATA | |
| | FIRST VEHICLE | CONTRACT DATA |
| | SECOND VEHICLE | CONTRACT DATA |
| | UNREGISTERED VEHICLE | CONTRACT DATA |
| | TERMINAL DATA | |
| | ADMINISTRATOR TERMINAL | IDENTIFICATION DATA |
| | FIRST TERMINAL | IDENTIFICATION DATA |
| | SECOND TERMINAL | IDENTIFICATION DATA |
| SECOND ADMINISTRATOR | | |
| | USER DATA | |
| | SECOND ADMINISTRATOR NAME | FILTERING: OFF |
| | VEHICLE DATA | |
| | FIRST VEHICLE | CONTRACT DATA |
| | TERMINAL DATA | |
| | ADMINISTRATOR TERMINAL | IDENTIFICATION DATA |

FIG. 6

VEHICLE EXTERNAL COMMUNICATION CONTROL SYSTEM FOR TERMINAL IN VEHICLE

CROSS-REFERENCE TO RELATED APPLICATIONS

The present application claims priority from Japanese Patent Application No. 2023-065568 filed on Apr. 13, 2023, the entire contents of which are hereby incorporated by reference.

BACKGROUND

The disclosure relates to a vehicle external communication control system for a terminal in a vehicle.

Some vehicles such as automobiles include a vehicle external communication device communicable with a base station for an advanced driver assistance system (ADAS) or a base station that allows low-latency and high-speed communication for a 5th generation (5G) communication network. It is possible for such a vehicle to acquire, for example, data for automated driving including driving assistance with the vehicle external communication device communicating with a server through a base station.

SUMMARY

An aspect of the disclosure provides a vehicle external communication control system for one or more terminals in a vehicle. The vehicle external communication control system is configured to control external communication of the one or more terminals through the vehicle. The vehicle external communication control system includes a vehicle internal communicator, a vehicle external communicator, a vehicle external communication controller, a setter, and a server. The vehicle internal communicator is disposed in the vehicle and communicable with the one or more terminals present in the vehicle. The vehicle external communicator is disposed in the vehicle and communicable with an external device outside the vehicle. The vehicle external communication controller is disposed in the vehicle and configured to control the external communication of the one or more terminals through the vehicle using the vehicle internal communicator and the vehicle external communicator. The setter is disposed in the vehicle and configured to make, on the vehicle external communication controller, a communication setting for the external communication of the one or more terminals through the vehicle. The server includes a server memory configured to record setting data regarding the external communication of the one or more terminals on an individual terminal basis. The server is communicable with the vehicle external communicator of the vehicle. The vehicle external communication controller is configured to be activated in a setting state in which the one or more terminals are unable to communicate with the external device through the vehicle. The setter is configured to: determine whether the one or more terminals communicable with the vehicle internal communicator are present in the vehicle; and upon detecting the one or more terminals present in the vehicle through the vehicle internal communicator, acquire the setting data regarding the external communication of the one or more terminals recorded on the individual terminal basis from the server through the vehicle external communicator, and make, on the vehicle external communication controller, the communication setting for the external communication of the one or more terminals on the individual terminal basis using the setting data recorded on the individual terminal basis acquired from the server to enable the external communication of the one or more terminals through the vehicle on the individual terminal basis.

An aspect of the disclosure provides a vehicle external communication control system for one or more terminals in a vehicle. The vehicle external communication control system is configured to control external communication of the one or more terminals through the vehicle. The vehicle external communication control system includes a vehicle internal communicator, a vehicle external communicator, a server, and circuitry. The vehicle internal communicator is disposed in the vehicle and communicable with the one or more terminals present in the vehicle. The vehicle external communicator is disposed in the vehicle and communicable with an external device outside the vehicle. The server includes a server memory configured to record setting data regarding the external communication of the one or more terminals on an individual terminal basis. The server is communicable with the vehicle external communicator of the vehicle. The circuitry is configured to: control the external communication of the one or more terminals through the vehicle using the vehicle internal communicator and the vehicle external communicator; make a communication setting for the external communication of the one or more terminals through the vehicle; be activated in a setting state in which the one or more terminals are unable to communicate with the external device through the vehicle; determine whether the one or more terminals communicable with the vehicle internal communicator is present in the vehicle; and upon detecting the one or more terminals present in the vehicle through the vehicle internal communicator, acquire the setting data regarding the external communication of the one or more terminals recorded on the individual one or more terminals basis from the server through the vehicle external communicator, and make the communication setting for the external communication of the one or more terminals on the individual terminal basis using the setting data recorded on the individual terminal basis acquired from the server to enable the external communication of the one or more terminals through the vehicle on the individual terminal basis.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 6 is an explanatory diagram of a registered user database recorded in a server memory of the vehicle server by the registration control of FIG. 5.

DETAILED DESCRIPTION

Figure 1:
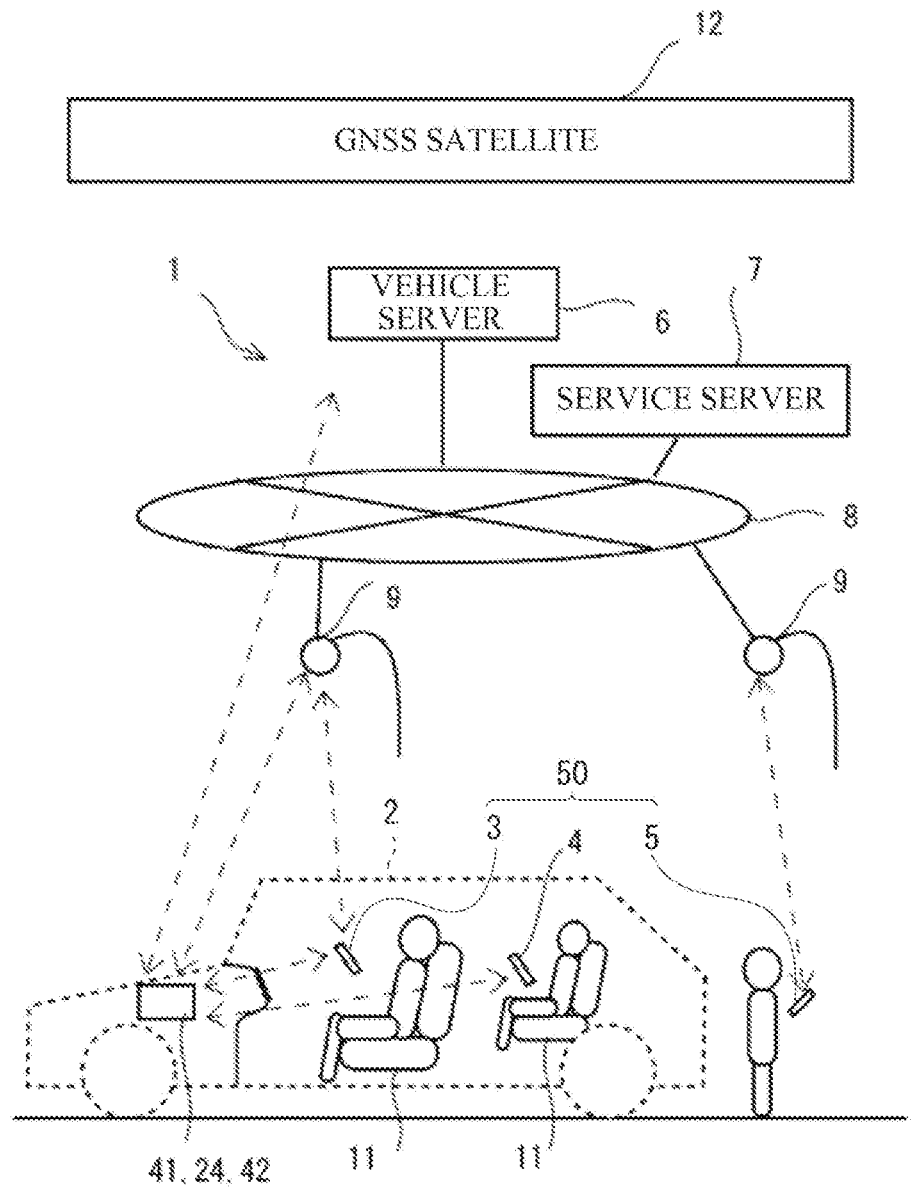
FIG. 1 is an explanatory diagram of a communication state of a vehicle and a portable terminal to which a vehicle external communication control system for a portable terminal in a vehicle according to one example embodiment of the disclosure is applicable.

In a vehicle including a vehicle external communication device communicable with, for example, a base station outside the vehicle, a terminal of an occupant such as a driver who is on the vehicle may be allowed to communicate with an external device through the vehicle. For example, reference is made to Japanese Unexamined Patent Application Publication Nos. 2005-260469 and 2019-216412.

However, in the techniques disclosed in Japanese Unexamined Patent Application Publication Nos. 2005-260469 and 2019-216412 described above, the terminal is to communicate with an external device through the vehicle basically under a setting that is the same as the setting made on the vehicle. The same applies to a case where multiple terminals are present in the vehicle. Thus, the terminal used by an occupant other than the driver who is an administrator of the vehicle also communicates with an external device through the vehicle under the setting similar to the setting of an administrator terminal of the driver. As a result, for example, even if the driver has set an access restriction such as filtering for a terminal used by a child on a router device at home, the vehicle external communication device makes it possible for the terminal of the child to communicate with an external device in a state where the setting of the access restriction at home is removed when the terminal is brought into the vehicle.

Each time the terminal used by the child is brought into the vehicle, the driver is to make the setting of the access restriction on the vehicle for the terminal of the child.

It is desirable to provide a vehicle external communication control system that makes it possible to, in a vehicle, make external communication of a terminal present in the vehicle available under an intention of, for example, an administrator.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram of a communication state of a vehicle 2 and a portable terminal 50 to which a vehicle external communication control system 1 for the portable terminal 50 in the vehicle 2 according to a first example embodiment of the disclosure is applicable. The vehicle 2 may be, for example, an automobile.

In one embodiment, the portable terminal 50 may serve as a "terminal". In one embodiment, the vehicle 2 may serve as a "vehicle".

In FIG. 1, an administrator who is a driver, and an occupant other than the administrator, such as a child, may be on the vehicle 2. The administrator may carry the portable terminal 50 that serves as an administrator terminal 3, and be seated on a seat 11 on a front row of the vehicle 2. The occupant other than the administrator may carry the portable terminal 50 that serves as a general terminal 4, and be seated on a seat 11 on a rear row of the vehicle 2. In one embodiment, the administrator terminal 3 may serve as an "administrator terminal", and the general terminal 4 may serve as a "general terminal".

The portable terminal 50 may include, for example, a portable terminal communicable with a base station 9 that allows low-latency and high-speed communication for a 5G communication network, like the administrator terminal 3 in FIG. 1, and a portable terminal communicable with an access point provided at home, like the general terminal 4 in FIG. 1. Wireless communication between the portable terminal 50 and the access point may be compliant with a communication standard such as IEEE (Institute of Electrical and Electronics Engineers) 802.11. In this case, even when brought into the vehicle 2, the administrator terminal 3 in FIG. 1 may communicate with the base station 9. This makes it possible for the administrator terminal 3 to transmit and receive data to and from a service server 7 and a vehicle server 6, which are coupled to a communication network 8 of the base station 9, and to use these services. In contrast, when the general terminal 4 in FIG. 1 is, for example, away from home by more than a communicable distance, and communication is not established with the access point at home, it is difficult to transmit and receive data to and from the service server 7, which is coupled to the communication network 8, and to use the service. The communication network 8 may include, for example, a carrier communication network to which a base station for 5G communication network is coupled, a communication network for ADAS, and the Internet to which these communication networks are coupled. In one embodiment, the vehicle server 6 may serve as a "server".

As will be described later, some of the vehicles 2 in recent years may include a vehicle external communication device 41 communicable with a base station for ADAS or a base station that allows low-latency and high-speed communication for a 5G communication network. It is possible for the vehicle 2 to acquire, for example, data for automated driving including driving assistance with the vehicle external communication device 41 communicating with the vehicle server 6 through the base station 9.

Accordingly, using the vehicle external communication device 41 communicable with, for example, the base station 9 outside the vehicle 2 as described above, the portable terminal 50 of the occupant including the administrator on the vehicle 2 may be allowed to communicate with an external device through the vehicle 2. It is possible for the portable terminal 50 brought into the vehicle 2 to perform tethering using the vehicle 2 as an access point.

However, in this case, the portable terminal 50 may be to communicate with an external device through the vehicle 2 basically under a single setting made on the vehicle 2. It is also possible for the general terminal 4 of the occupant other than the administrator such as a child to communicate with an external device through the vehicle 2 under the setting that is the same as the one used by the administrator terminal 3. As a result, for example, even if the driver has set an access restriction such as filtering for the general terminal 4 used by the child on a router device at home, it is difficult to apply that setting to the external communication through the vehicle 2. When the general terminal 4 of the child is brought into the vehicle 2, it becomes possible for the general terminal 4 of the child to communicate with an external device in a state where the setting of the access restriction at home is removed.

As a result, each time the general terminal 4 used by the child is brought into the vehicle 2, the driver is to make the setting of the access restriction on the vehicle 2 for the general terminal 4 of the child.

As described above, in the vehicle 2, it may be desired that external communication of various portable terminals 50 brought into the vehicle 2 be made available under an intention of the administrator without imposing an excessive burden on the administrator, for example.

Further, it may also be desired that a portable terminal 5 (50) of another person outside the vehicle 2 in FIG. 1 be kept from establishing external communication through the vehicle 2 improperly.

In the following, a description is given on the vehicle external communication control system 1 for the portable terminal 50 in the vehicle 2 that helps to achieve such an objective according to an example embodiment of the disclosure.

Figure 2:
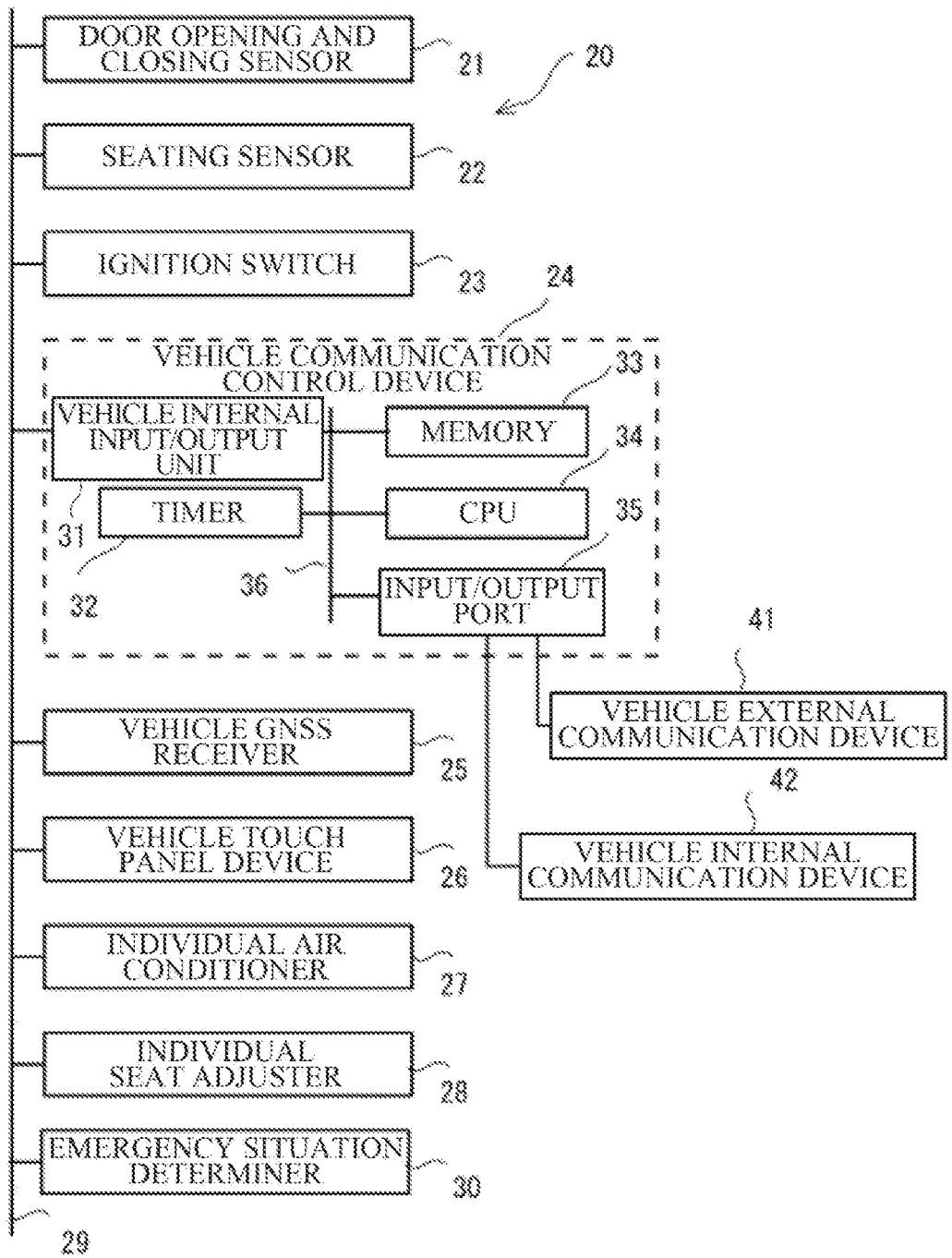
FIG. 2 is an explanatory diagram of a control system of the vehicle in FIG. 1.

FIG. 2 is an explanatory diagram of a control system 20 of the vehicle 2 in FIG. 1.

The control system 20 of the vehicle 2 illustrated in FIG. 2 may include a door opening and closing sensor 21, a seating sensor 22, an ignition switch 23, a vehicle GNSS (Global Navigation Satellite System) receiver 25, and a vehicle communication control device 24 to which these components are coupled. Further, a vehicle touch panel device 26, an individual air conditioner 27, an individual seat adjuster 28, an emergency situation determiner 30, the vehicle external communication device 41, and a vehicle internal communication device 42 may be coupled to the vehicle communication control device 24. In one embodiment, the vehicle external communication device 41 may serve as a "vehicle external communicator", and the vehicle internal communication device 42 may serve as a "vehicle internal communicator". The vehicle external communication device 41 and the vehicle internal communication device 42 may include one or more telematics communication units (one or more TCUs) and/or one or more antennas.

Note that the vehicle communication control device 24 may be coupled to the above-described various components through a vehicle network 29. The vehicle network 29 may be a wired communication network compliant with, for example, a controller area network (CAN) or a local interconnect network (LIN) for the vehicle 2. The vehicle network 29 may be a communication network such as a local area network (LAN) or a combination of these networks. The above-described various components coupled to the vehicle network 29 may be configured to transmit and receive detection data and control data to and from each other through the vehicle network 29. Note that the vehicle external communication device 41 and the vehicle internal communication device 42 may be coupled to the vehicle network 29.

The door opening and closing sensor 21 may be a sensor that detects opening and closing of a non-illustrated door that is opened and closed when, for example, an occupant gets on or off the vehicle 2. The door opening and closing sensor 21 may be provided for each door when multiple doors are provided on the vehicle 2. The door opening and closing sensor 21 may output detection data regarding opening and closing of the door to the vehicle network 29 when the door is opened or when the door is closed. This makes it possible for the control system 20 of the vehicle 2 to estimate that the occupant has gotten on the vehicle 2 upon detecting that the door has been opened and closed, for example, in a state where there is no occupant in a vehicle compartment. Further, when it is detected that the door has been opened and closed in a state where there is an occupant in the vehicle compartment, it is possible for the control system 20 of the vehicle 2 to estimate that the occupant has gotten off the vehicle compartment of the vehicle 2.

The seating sensor 22 may be a sensor that detects that the occupant who has gotten on the vehicle 2 is seated on the seat 11. The seating sensor 22 may be, for example, a pressure sensitive sensor or an ultrasonic sensor provided on a seating surface of a seating position on the seat 11. The seating sensor 22 may be provided for each of seating positions of the seat 11 set in accordance with capacity of the vehicle 2. The seating sensor 22 may output, to the vehicle network 29, detection data indicating that the occupant is seated at the seating position on the corresponding seat 11. Further, in addition to presence or absence of the occupant on each seat 11, the seating sensor 22 may detect a feature such as a physical size of the occupant seated on the seat 11, and output these pieces of data to the vehicle network 29. This makes it possible for the control system 20 of the vehicle 2 to determine, for example, on which seat 11 an adult is seated or a child such as an infant is seated.

Note that the vehicle 2 may include a non-illustrated in-vehicle camera that captures an image inside the vehicle compartment of the vehicle 2. This makes it possible for the control system 20 of the vehicle 2 to determine the presence or absence of an occupant on each seat 11 or determine the physical size of the occupant seated on the seat 11 based on a captured image of the in-vehicle camera.

The ignition switch 23 may be a switch that is turned on by the administrator to enable the vehicle 2 to travel, or is turned off by the administrator to prevent the vehicle 2 from traveling. The ignition switch 23 may be provided, for example, around the seat 11 on which the driver who serves as the administrator is seated in the vehicle compartment of the vehicle 2. A state of the vehicle 2 may be shifted between a stopped state and a travelable state by turning on and off the ignition switch 23. When being turned on from an OFF state or turned off from an ON state by the administrator, the ignition switch 23 may output operation data to the vehicle network 29.

The vehicle GNSS receiver 25 may receive electric waves of GNSS satellites 12 illustrated in FIG. 1 and generate a current position of the vehicle 2 in which the vehicle GNSS receiver 25 is provided. Additionally, the vehicle GNSS receiver 25 may receive electric waves of the base station 9, and correct or generate the current position of the vehicle 2. It is possible, even at this point, to generate the position that is accurate to an error of tens of centimeters by the vehicle GNSS receiver 25. The vehicle GNSS receiver 25 may output the generated data on the current position of the vehicle 2 to the vehicle network 29.

The vehicle touch panel device 26 may be provided for a user interface in the vehicle compartment of the vehicle 2. The vehicle touch panel device 26 may be provided at a position that allows the driver to operate such as in a dashboard or a center console. Additionally, the vehicle touch panel device 26 may be provided in the vehicle compartment as a meter panel. Further, a user interface other than the vehicle touch panel device 26, such as a microphone, a speaker, an image projection device, or a non-contact operation device may be provided in the vehicle compartment of the vehicle 2. The user interface such as the vehicle touch panel device 26 may output information, based on output data acquired from the vehicle network 29, and may output data on operation input by the occupant to the vehicle network 29.

The individual air conditioner 27 may be provided in the vehicle 2 for the occupant of the vehicle 2. Multiple individual air conditioners 27 may be provided, for example, so as to correspond one-to-one with multiple seating positions for occupants or to correspond one-to-one with some of the multiple seating positions. The vehicle 2 may be provided with an air conditioner for the entire vehicle compartment separately from the individual air conditioner 27. The setting of the individual air conditioner 27 may be changed based on data acquired from the vehicle network 29.

The individual seat adjuster 28 may be provided in the vehicle 2 for the occupant of the vehicle 2. The individual seat adjuster 28 may be a device that adjusts, for example, a height of the seating position of each seat 11 on which the occupant of the vehicle 2 is to be seated and an inclination angle of a backrest. Multiple individual seat adjusters 28 may be provided, for example, so as to correspond one-to-one with multiple seats 11 of the vehicle 2 or to correspond one-to-one with some of the multiple seats 11. The setting of the individual seat adjuster 28 may be changed based on data acquired from the vehicle network 29.

The emergency situation determiner 30 may be a device that determines an emergency situation in the vehicle 2. The emergency situation of the vehicle 2 may include, for example, a contact prediction, a contact detection, and a driver anomaly. The emergency situation determiner 30 may monitor occurrence of these conditions. When an emergency situation occurs, the emergency situation determiner 30 may output data on an emergency notification to the vehicle network 29 and cause the data to be transmitted to, for example, the vehicle server 6 through the vehicle external communication device 41. In one embodiment, the emergency situation determiner 30 may serve as an "emergency situation determiner".

The vehicle external communication device 41 may establish a wireless communication path with various base stations 9 provided on, for example, a road on which the vehicle 2 is traveling. The base station 9 may include, for example, a base station for ADAS or a base station for a 5G communication network. The vehicle external communication device 41 may transmit and receive data to and from the vehicle server 6 and the service server 7 in FIG. 1 through the base station 9.

The vehicle internal communication device 42 may detect the portable terminal 50 brought into the vehicle 2 and establish a wireless communication path with the detected portable terminal 50. The vehicle internal communication device 42 may be compliant with a near field communication standard such as IEEE802.1x or IEEE802.15, for example. The vehicle internal communication device 42 may transmit and receive data to and from the portable terminal 50 with which the vehicle internal communication device 42 has established the wireless communication path.

The vehicle communication control device 24 may be provided in the control system 20 of the vehicle 2, and control communication of the control system 20 of the vehicle 2 with an external device. The vehicle communication control device 24 may be coupled to the vehicle external communication device 41 and the vehicle internal communication device 42, and control communication of the vehicle external communication device 41 and the vehicle internal communication device 42. In the external communication through the vehicle 2 for the portable terminal 50, the vehicle external communication device 41 may receive data through the base station 9. The vehicle communication control device 24 may cause the data received through the base station 9 to be outputted to the vehicle internal communication device 42 and transmitted to the portable terminal 50. Further, the vehicle internal communication device 42 may receive data from the portable terminal 50. The vehicle communication control device 24 may cause the data received from the portable terminal 50 to be outputted to the vehicle external communication device 41 and transmitted to the base station 9. The vehicle communication control device 24 may be to control routing of data between the vehicle external communication device 41 and the vehicle internal communication device 42.

The vehicle communication control device 24 may include a vehicle internal input/output unit 31, a timer 32, an input/output port 35, a memory 33, a central processing unit (CPU) 34, and an inner bus 36 to which these components are coupled.

The vehicle internal input/output unit 31 may be coupled to the vehicle network 29. The vehicle internal input/output unit 31 may acquire data to be used for control by the vehicle communication control device 24 from the vehicle network 29. The vehicle internal input/output unit 31 may output data generated by the vehicle communication control device 24 to the vehicle network 29.

The timer 32 may measure a time or a time period.

The vehicle external communication device 41 and the vehicle internal communication device 42 may be coupled to the input/output port 35.

The memory 33 may record programs and data to be used by the CPU 34 for vehicle communication control. The memory 33 may include a nonvolatile memory and a volatile memory. The programs and the data recorded in the memory 33 in a nonvolatile manner may be those that have been recorded in a non-transitory tangible recording medium and installed.

The CPU 34 may read and execute the programs recorded in the memory 33. This may implement, in the vehicle communication control device 24, a control processor that controls vehicle communication of the control system 20.

Figure 7:
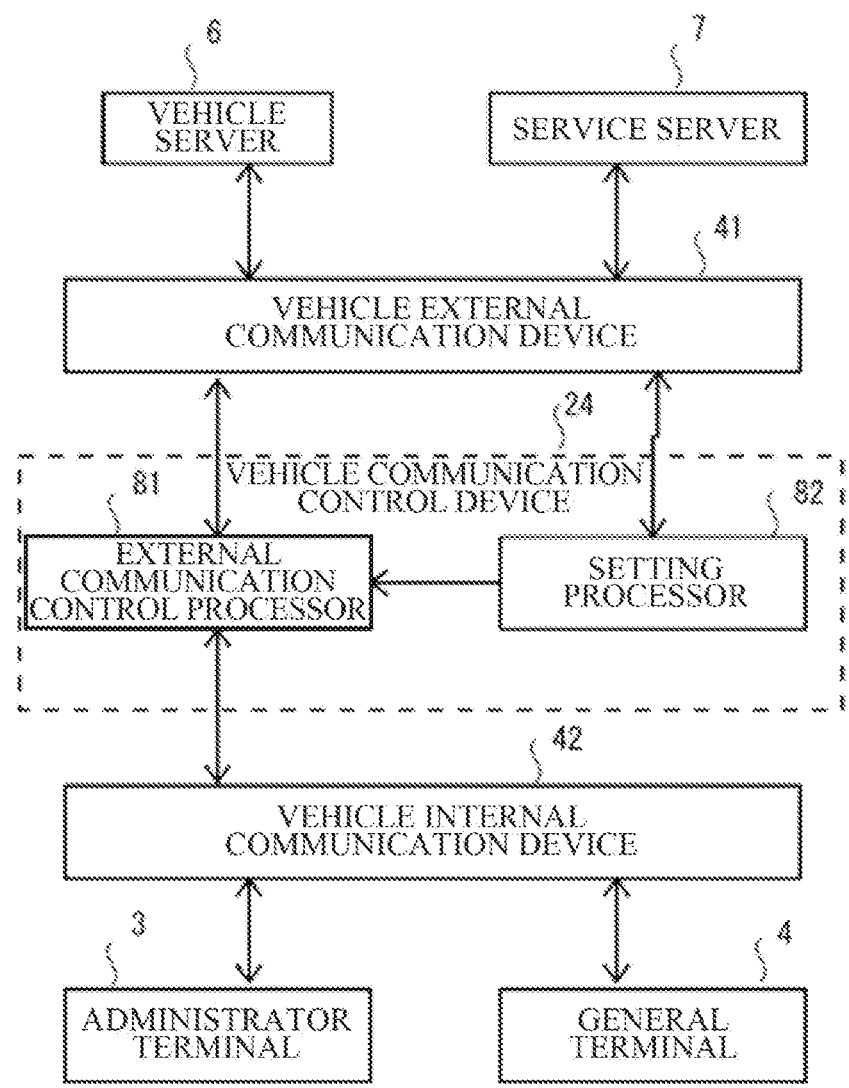
FIG. 7 is an explanatory diagram of the vehicle external communication control system for the portable terminal in the vehicle illustrated in FIG. 1.

As illustrated in FIG. 7, which will be described later, the control processor of the vehicle communication control device 24 may include a vehicle external communication control processor 81 and a setting processor 82. In one embodiment, the vehicle external communication control processor 81 may serve as a "vehicle external communication controller" or a "vehicle external communication control device", and the setting processor 82 may serve as a "setter" or a "setting device". The vehicle external communication control processor 81 may control routing of data between the vehicle external communication device 41 and the vehicle internal communication device 42. The setting processor 82 may make a setting for routing control or other control on the vehicle external communication control processor 81. In this case, the vehicle external communication control processor 81 may be to execute the routing control between the vehicle external communication device 41 and the vehicle internal communication device 42 under the setting made by the setting processor 82.

Figure 3:
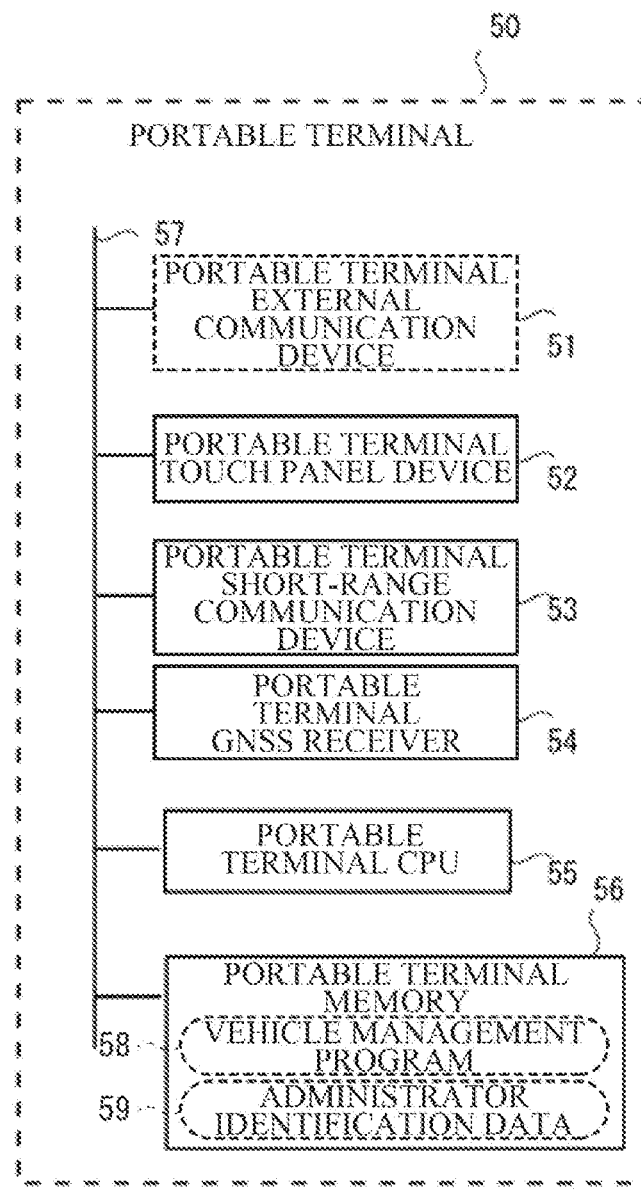
FIG. 3 is an explanatory diagram of a portable terminal that may be brought into the vehicle in FIG. 1.

FIG. 3 is an explanatory diagram of the portable terminal 50 that may be brought into the vehicle 2 in FIG. 1.

The portable terminal 50 in FIG. 3 may be the administrator terminal 3 in FIG. 1. The portable terminal 50 may include a portable terminal external communication device 51, a portable terminal touch panel device 52, a portable terminal short-range communication device 53, a portable terminal GNSS receiver 54, a portable terminal CPU 55, a portable terminal memory 56, and a portable terminal bus 57 to which these components are coupled. Also, the general terminal 4 of the occupant in FIG. 1 and other terminals may have a configuration similar to that of the portable terminal 50 in FIG. 3. The portable terminal 50 described above may be, for example, a mobile telephone terminal, a smartphone terminal, a tablet terminal, or a mobile PC terminal.

The portable terminal external communication device 51 may establish a wireless communication path with the base station 9 for a 5G communication network. The portable terminal external communication device 51 may be configured to transmit and receive data to and from the vehicle server 6 and the service server 7 in FIG. 1 through the base station 9.

The portable terminal touch panel device 52 may be a user interface for a user of the portable terminal 50.

The portable terminal short-range communication device 53 may establish a wireless communication path with an access point at home, for example. The portable terminal short-range communication device 53 may be configured to transmit and receive data to and from the vehicle server 6 and the service server 7 in FIG. 1 through the access point.

The portable terminal GNSS receiver 54 may receive electric waves of the GNSS satellites 12 illustrated in FIG. 1 and generate a current position of the portable terminal 50 in which the portable terminal GNSS receiver 54 is provided. Additionally, the portable terminal GNSS receiver 54 may receive electric waves of the base station 9, and correct or generate the current position of the portable terminal 50.

The portable terminal memory 56 may record programs to be executed by the portable terminal CPU 55 and data. The programs and the data recorded in the portable terminal memory 56 in a nonvolatile manner may be those that have been recorded in a non-transitory tangible recording medium and installed. Since the portable terminal memory 56 in FIG. 3 is an illustration of the portable terminal memory 56 of the administrator terminal 3, the portable terminal memory 56 may record a vehicle management program 58 and administrator identification data 59. The vehicle management program 58 may be an application program that the administrator of the vehicle 2 optionally installs in his or her portable terminal 50 to manage the vehicle 2. The administrator identification data 59 may be identification data issued by the vehicle server 6 when the administrator inputs administrator data 71 to the portable terminal 50 executing the vehicle management program 58. Multiple administrators registered in a later-described registered user database (DB) 70 in the vehicle server 6 may each be assigned with unique administrator identification data 59. The administrator identification data 59 registered in the vehicle server 6 may be recorded in the administrator terminal 3, which is the portable terminal 50 of the administrator of the vehicle 2. In contrast, the vehicle management program 58 and the administrator identification data 59 may be unrecorded in the general terminal 4 of the occupant other than the administrator. In one embodiment, the administrator identification data 59 may serve as an "administrator identification data".

The portable terminal CPU 55 may read and execute the programs recorded in the portable terminal memory 56. This may implement, in the portable terminal 50, a portable terminal control processor that controls operation of the portable terminal 50.

Figure 4:
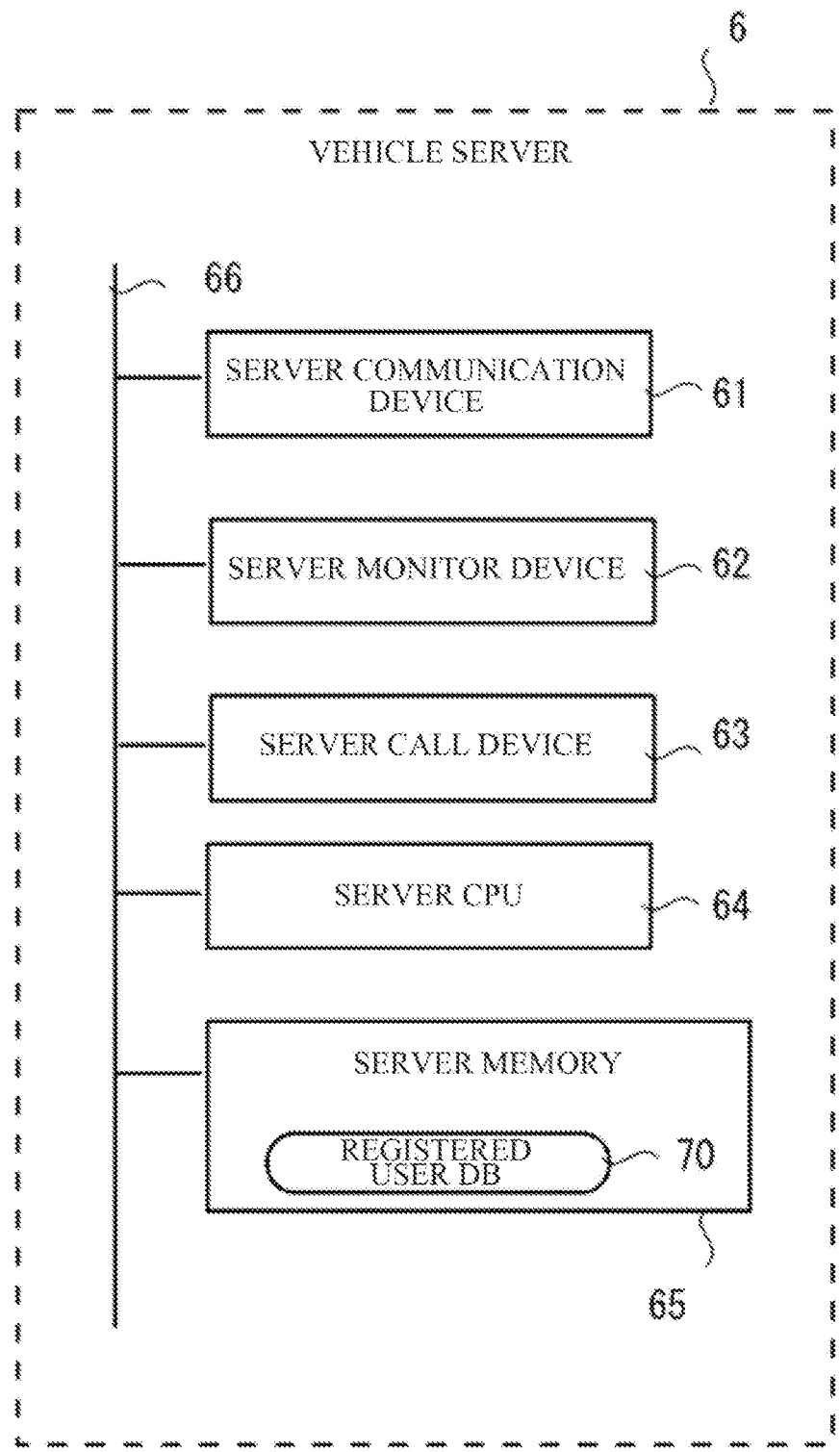
FIG. 4 is an explanatory diagram of a vehicle server in FIG. 1.

FIG. 4 is an explanatory diagram of the vehicle server 6 in FIG. 1.

The vehicle server 6 illustrated in FIG. 4 may include a server communication device 61, a server monitor device 62, a server call device 63, a server CPU 64, a server memory 65, and a server bus 66 to which these devices are coupled. The service server 7 in FIG. 1 may also have a configuration similar to that of the vehicle server 6 in FIG. 4. In one embodiment, the server memory 65 may serve as a "server memory".

The server communication device 61 may be coupled to the communication network 8. The server communication device 61 may be configured to transmit and receive data by communicating with, for example, the vehicle external communication device 41 of the vehicle 2 through the communication network 8.

The server monitor device 62 and the server call device 63 may be user interfaces for an operator of the server.

The server memory 65 may record programs and data to be used by the server CPU 64 to manage vehicles. The programs and the data recorded in the server memory 65 in a nonvolatile manner may be those that have been recorded in a non-transitory tangible recording medium and installed. The registered user DB 70 may be recorded in the server memory 65 in FIG. 4. In the registered user DB 70, for example, the administrator data 71 inputted by the administrators of multiple vehicles 2 in the vehicle management program 58 may be registered.

The server CPU 64 may read and execute the programs recorded in the server memory 65. This may implement, in the vehicle server 6, a server control processor that controls operation of the vehicle server 6.

Figure 5:
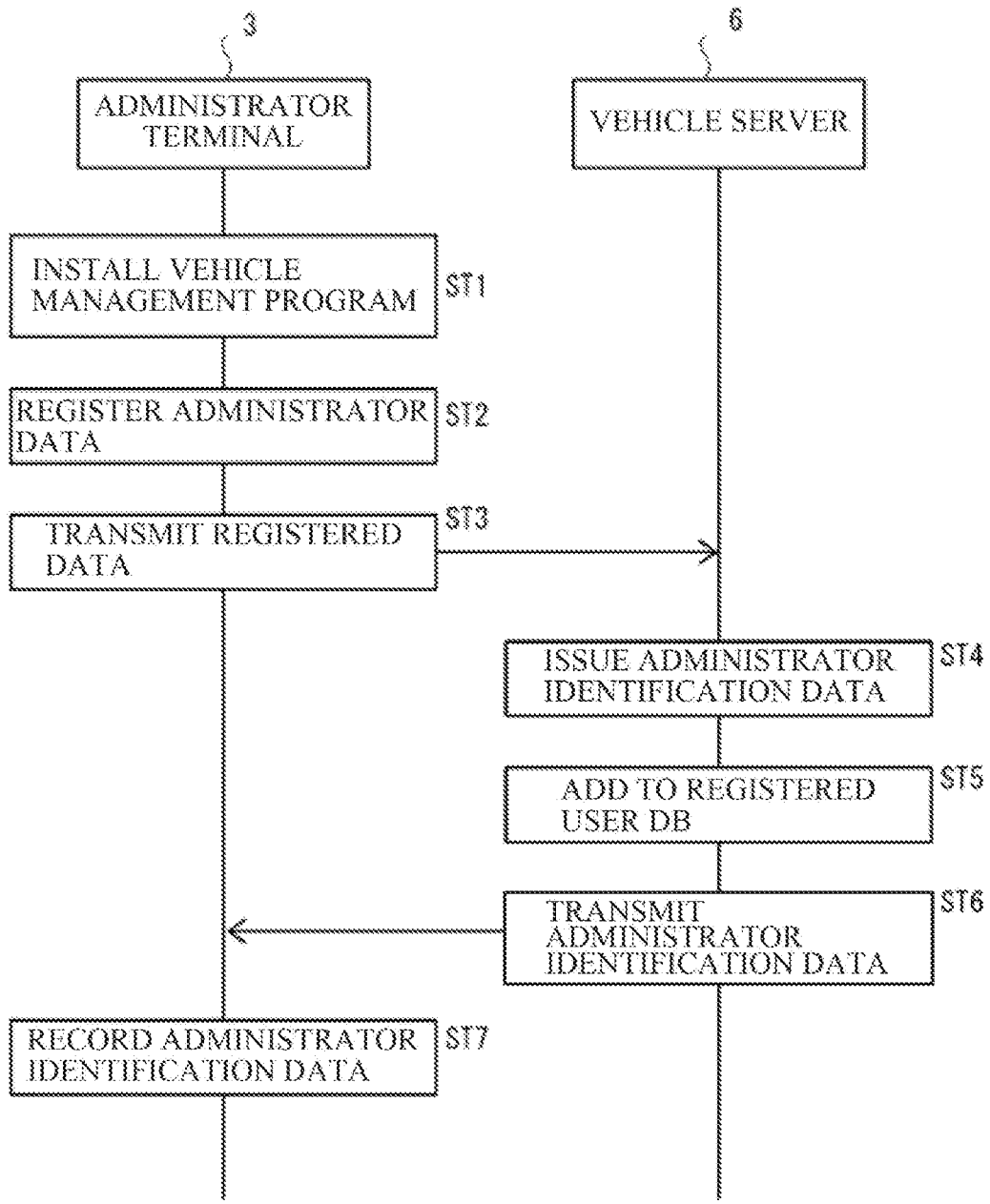
FIG. 5 is a timing chart of registration control that registers administrator identification data through communication between an administrator terminal and the vehicle server.

FIG. 5 is a timing chart of registration control that registers the administrator identification data 59 through communication between the administrator terminal 3 and the vehicle server 6.

FIG. 5 illustrates the portable terminal 50, which serves as the administrator terminal 3, and the vehicle server 6. In FIG. 5, time flows from top to bottom.

In step ST1, the portable terminal CPU 55 of the administrator terminal 3 may acquire the vehicle management program 58 from, for example, the vehicle server 6 through the communication network 8 and have the vehicle management program 58 installed in the administrator terminal 3, in response to operation of the administrator on the portable terminal touch panel device 52.

In step ST2, the portable terminal CPU 55 of the administrator terminal 3 may register the administrator data 71 in the portable terminal memory 56, in response to operation of the administrator on the portable terminal touch panel device 52.

In step ST3, the portable terminal CPU 55 of the administrator terminal 3 may transmit the administrator data 71 registered in the portable terminal memory 56 in step ST2 from, for example, the portable terminal external communication device 51 to the vehicle server 6 through the communication network 8.

In step ST4, the server CPU 64 of the vehicle server 6 may issue the administrator identification data 59 unique to the administrator in response to the server communication device 61 receiving the administrator data 71 from the administrator terminal 3.

In step ST5, the server CPU 64 of the vehicle server 6 may associate the administrator data 71 received by the server communication device 61 with the administrator identification data 59 that has been issued, and additionally register the administrator data 71 and the administrator identification data 59 in the registered user DB 70 of the server memory 65.

In step ST6, the server CPU 64 of the vehicle server 6 may transmit the administrator identification data 59 that has been issued, from the server communication device 61 to the portable terminal external communication device 51 of the administrator terminal 3 through the communication network 8.

In step ST7, the portable terminal CPU 55 of the administrator terminal 3 may record, in the portable terminal memory 56, the administrator identification data 59 received by the portable terminal external communication device 51 from the vehicle server 6.

As a result, the portable terminal 50 of the administrator may be to be changed from the general terminal 4 to the administrator terminal 3.

In contrast, the general terminal 4 may refer to the portable terminal 50 including the portable terminal memory 56 in which neither the vehicle management program 58 nor the administrator identification data 59 is recorded.

FIG. 6 is an explanatory diagram of the registered user DB 70 recorded in the server memory 65 of the vehicle server 6 through the registration control of FIG. 5.

The registered user DB 70 of FIG. 6 may include the administrator data 71 of multiple administrators. The administrator data 71 of each administrator may include administrator identification data 72 that is assigned to each administrator and has been registered, and user data 73, vehicle data 74, and terminal data 75 that have been registered by, for example, the administrator.

The user data 73 may include data on multiple occupant names that makes it possible to identify multiple occupants including the administrator of the vehicle 2. Each occupant name may be associated with setting data of the vehicle 2 for each occupant. For example, in the administrator data 71 of a first administrator in FIG. 6, the user data 73 may include a "first administrator name", a "first user name", and a "second user name". The "first administrator name" may be an occupant name indicating the first administrator. The "first user name" may be an occupant name indicating a first user who gets on the vehicle 2 together with the first administrator. The "second user name" may be an occupant name indicating a second user who gets on the vehicle 2 together with the first administrator. The "first administrator name" may be associated with a filtering setting being turned off in the external communication and setting data of the seat 11 as administrator setting data for the first administrator. The "first user name" may be associated with a filtering setting being turned off in the external communication and setting data of the seat 11 as individual setting data for the first user. The "second user name" may be associated with a filtering setting being turned on in the external communication and setting data of the individual air conditioner 27 as individual setting data for the second user. Data on the filtering setting in the external communication may include setting data on the access restriction regarding the external communication of the portable terminal 50 through the vehicle 2. Note that the user data 73 may include data on whether to allow external communication through the vehicle 2 individually for each registered occupant.

The vehicle data 74 may include data on the vehicle 2 on which the administrator rides. The vehicle data 74 may include data on multiple vehicles 2. The data on each vehicle 2 may be associated with contract data regarding a service provided by the vehicle server 6 for each vehicle 2. The contract data may include data on, for example, presence or absence of a use contract for each vehicle 2 and a use period. For example, in the administrator data 71 of the first administrator in FIG. 6, the vehicle data 74 may include a "first vehicle" and a "second vehicle" as vehicles 2 used by the first administrator. Additionally, the vehicle data 74 may include an "unregistered vehicle" managed by an administrator other than the first administrator.

The terminal data 75 may include data on the administrator terminal 3, which is the portable terminal 50 used by the administrator, and data on the general terminal 4 used by the occupant who gets on the vehicle 2 together with the administrator. The terminal data 75 may include data on multiple general terminals 4. For example, in the administrator data 71 of the first administrator in FIG. 6, the terminal data 75 may include the "administrator terminal", a "first terminal", and a "second terminal". The "administrator terminal" may be data on the portable terminal 50, which serves as the administrator terminal 3 used by the first administrator. The "first terminal" may be data on the portable terminal 50 used by the first user. The "second terminal" may be data on the second terminal used by the second user. As described above, the data of each portable terminal 50 may be associated with the identification data of the portable terminal 50 to identify each portable terminal 50 from another portable terminal. For example, a MAC address unique to the portable terminal external communication device 51 of the portable terminal 50 may be used as the identification data of the portable terminal 50.

As described above, the setting data regarding the external communication of the portable terminal 50 may be recorded in the server memory 65 of the vehicle server 6 individually for each portable terminal 50. The server memory 65 may record, in association with the administrator identification data 72 regarding the administrator of the vehicle 2, the administrator setting data regarding the external communication of the administrator terminal 3 of the administrator and the individual setting data regarding the external communication of the general terminal 4 of the occupant of the vehicle 2 other than the administrator. It is possible to use the data on the filtering setting in the external communication for each occupant registered in the user data 73 as the data on the filtering setting in the external communication for the portable terminal 50 associated with the user.

Note that the data on the filtering setting may be recorded in the server memory 65 as part of the setting data of each portable terminal 50. Alternatively, the setting data of each portable terminal 50 including the data on the filtering setting may be recorded in the server memory 65 as the data for each of the occupants including the administrator, together with, for example, the identification data of the terminal. Even in these cases, it is possible for the server memory 65 to record the data corresponding to the terminal detected in the vehicle 2 to be uniquely identifiable.

FIG. 7 is an explanatory diagram of the vehicle external communication control system 1 for the portable terminal 50 in the vehicle 2 illustrated in FIG. 1 according to the example embodiment.

The vehicle external communication control system 1 for the portable terminal 50 in FIG. 7 may include the vehicle external communication device 41, the vehicle external communication control processor 81, the setting processor 82, and the vehicle internal communication device 42 of the vehicle 2, and the vehicle server 6. FIG. 7 also illustrates the service server 7, and the administrator terminal 3 and the general terminal 4 that are brought into the vehicle 2.

The setting processor 82 may make a setting for each component of the vehicle 2 including the vehicle external communication control processor 81. For example, the setting processor 82 may make a communication setting on the vehicle external communication control processor 81. The communication setting may be, for example, for routing control between the vehicle external communication device 41 and the vehicle internal communication device 42. The routing control may be for the external communication of the portable terminal 50. For example, the setting processor 82 may make a setting on the vehicle external communication control processor 81 for enabling or disabling the external communication of the portable terminal 50, or make a setting of the access restriction in the external communication individually for each portable terminal 50.

The vehicle external communication control processor 81 may be coupled to the vehicle external communication device 41 and the vehicle internal communication device 42. When the external communication of the portable terminal 50 is enabled by the setting processor 82, the vehicle external communication control processor 81 may cause the portable terminal 50 to communicate with an external device through the vehicle 2 using the vehicle external communication device 41 and the vehicle internal communication device 42. For example, when the external communication through the vehicle 2 is enabled, the vehicle external communication control processor 81 may execute the routing control between the vehicle external communication device 41 and the vehicle internal communication device 42. This makes it possible for the administrator terminal 3 or the general terminal 4 brought into the vehicle 2 to communicate with an external device through the vehicle 2, and transmit and receive data to and from the service server 7 and the vehicle server 6. In contrast, when the external communication through the vehicle 2 is disabled, the vehicle external communication control processor 81 may stop the routing control between the vehicle external communication device 41 and the vehicle internal communication device 42. As a result, the administrator terminal 3 or the general terminal 4 brought into the vehicle 2 may become unable to communicate with an external device through the vehicle 2, and to transmit and receive data to and from the service server 7 and the vehicle server 6. This makes it possible to reduce the data transmitted and received to and from the base station 9 through the vehicle external communication device 41 provided in the vehicle 2.

Additionally, when the access restriction of the external communication is set regarding a predetermined portable terminal 50, the vehicle external communication control processor 81 may determine whether external communication is subject to the access restriction in the routing control regarding the portable terminal 50. When the external communication is subject to the access restriction, the vehicle external communication control processor 81 may prohibit transmission and reception of data between the vehicle external communication device 41 and the vehicle internal communication device 42 for the external communication that is subject to the access restriction. In contrast, when the external communication is not subject to the access restriction, the vehicle external communication control processor 81 may transmit and receive data between the vehicle external communication device 41 and the vehicle internal communication device 42 for the external communication that is not subject to the access restriction. As a result, the external communication subject to the restriction may become unavailable for the portable terminal 50 subject to the access restriction.

Figure 8:
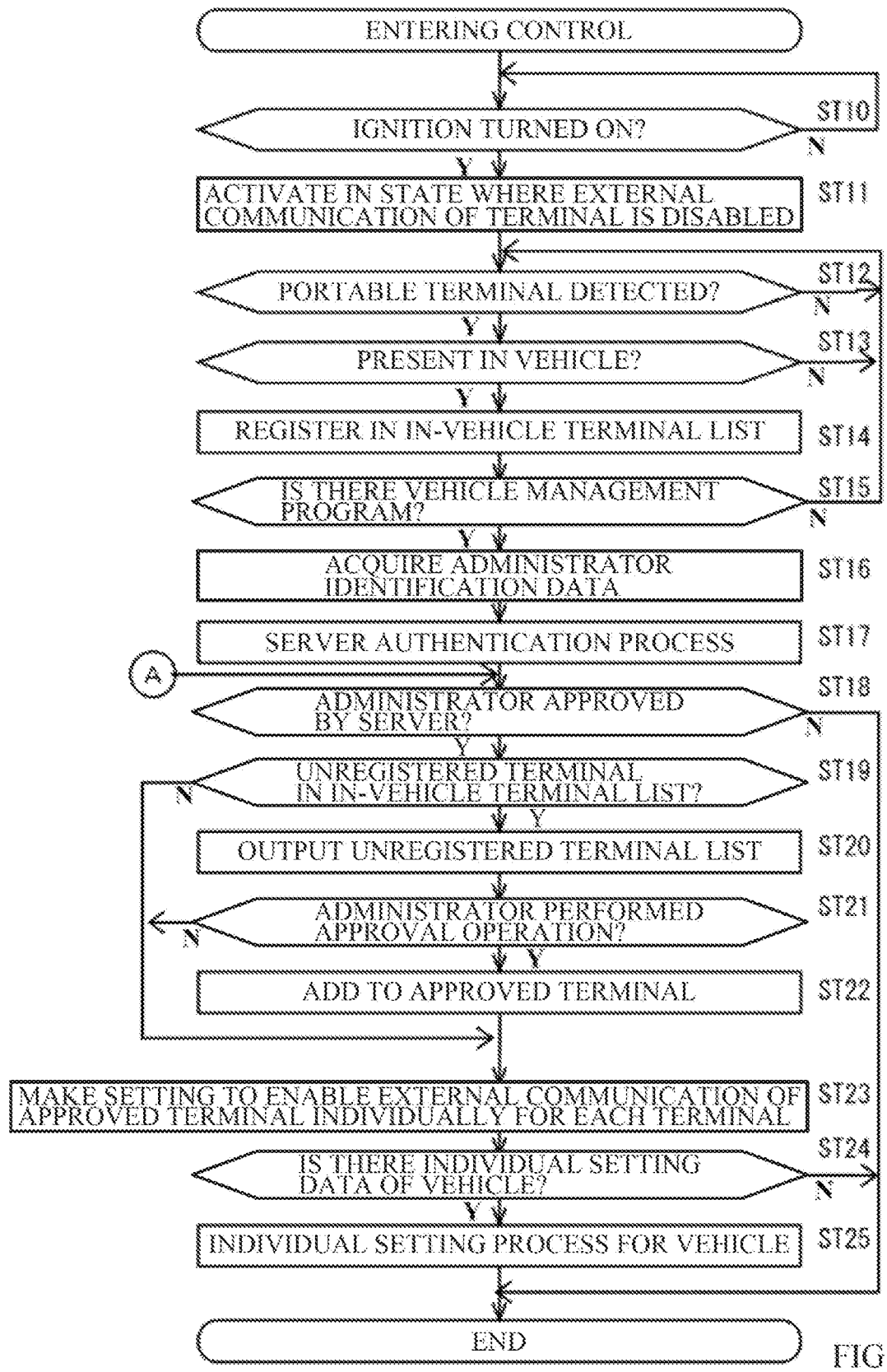
FIG. 8 is a flowchart of entering control that is performed when an occupant gets on the vehicle and for external communication of the portable terminal, the entering control being executed by a setting processor in FIG. 7.

FIG. 8 is a flowchart of entering control that is performed when the occupant gets on the vehicle 2 and for the external communication of the portable terminal 50. The entering control may be executed by the setting processor 82 in FIG. 7.

The CPU 34 of the vehicle communication control device 24 in FIG. 2 may execute, as the setting processor 82, the entering control for external communication illustrated in FIG. 8.

In step ST10, the setting processor 82 may determine whether the ignition switch 23 is turned on by the occupant such as the administrator. When the ignition switch 23 is not turned on (step ST10: N), the setting processor 82 may repeat the process. When the ignition switch 23 is turned on (step ST10: Y), the setting processor 82 may cause the process to proceed to step ST11.

In step ST11, the setting processor 82 may make a disabling setting on the vehicle external communication control processor 81 to make the portable terminal 50 unable to communicate with an external device through the vehicle 2. As a result, the vehicle external communication control processor 81 may be activated in a state where no routing control is performed between the vehicle external communication device 41 and the vehicle internal communication device 42. In other words, the vehicle external communication control processor 81 may be activated in a state where the external communication of the portable terminal 50 is disabled.

From step ST12, the setting processor 82 may start a detection process to detect the portable terminal 50 brought into the vehicle 2. First, the setting processor 82 may determine whether the portable terminal 50 is detected by the vehicle internal communication device 42. When the administrator terminal 3 or the general terminal 4 is brought into the vehicle 2 as in FIG. 1, the setting processor 82 may detect the portable terminal 50 communicable with the vehicle internal communication device 42 (step ST12: Y). In this case, the setting processor 82 may cause the process to proceed to step ST13. When the portable terminal 50 communicable with the vehicle internal communication device 42 is not detected (step ST12: N), the setting processor 82 may repeat the process.

In step ST13, the setting processor 82 may determine whether the portable terminal 50 communicable with the vehicle internal communication device 42 is present in the vehicle 2. For example, the setting processor 82 may acquire position data from the portable terminal 50 communicable with the vehicle internal communication device 42, and compare the position data with position data of an own vehicle. The own vehicle may be the vehicle 2. When a difference between the position of the portable terminal 50 and the position of the own vehicle is less than or equal to a distance on which it is possible to determine that the portable terminal 50 is present in the vehicle 2, the setting processor 82 may determine that the portable terminal 50 communicable with the vehicle internal communication device 42 is present in the vehicle 2. Alternatively, for example, the setting processor 82 may measure a response time of the portable terminal 50 to a request from the vehicle internal communication device 42 using the timer 32, and determine that the portable terminal 50 is present in the vehicle 2 based on the fact that the response time is less than or equal to a time period on which it is possible to determine that the portable terminal 50 is present in the vehicle 2. When it is determined that the portable terminal 50 communicable with the vehicle internal communication device 42 is present in the vehicle 2 (step ST13: Y), the setting processor 82 may cause the process to proceed to step ST14. When it is not determined that the portable terminal 50 communicable with the vehicle internal communication device 42 is present in the vehicle 2 (step ST13: N), the setting processor 82 may cause the process to return to step ST12. Thus, the setting processor 82 may repeat the process of steps ST12 and ST13 until the vehicle internal communication device 42 detects the portable terminal 50 brought into the vehicle 2.

In step ST14, the setting processor 82 may register the portable terminal 50 determined to be present in the vehicle 2 in an in-vehicle terminal list for managing the portable terminal 50 present in the vehicle 2. The in-vehicle terminal list may be recorded in the memory 33. Through the process so far, the administrator terminal 3 and the general terminal 4 brought into the vehicle 2 in FIG. 1 may be registered in the in-vehicle terminal list. In contrast, no portable terminal 5 (50) of another person that is not brought into the vehicle 2 can be registered in the in-vehicle terminal list.

In step ST15, the setting processor 82 may determine whether the portable terminal 50 determined to be present in the vehicle 2 is the administrator terminal 3. The setting processor 82 may communicate with the portable terminal 50 determined to be present in the vehicle 2 using, for example, the vehicle internal communication device 42, and determine whether a vehicle program is installed in the portable terminal 50. When the vehicle program is not installed in the portable terminal 50 determined to be present in the vehicle 2 (step ST15: N), the setting processor 82 may cause the process to return to step ST12. The setting processor 82 may repeat the process from step ST12 to step ST15 until the administrator terminal 3 present in the vehicle 2 is detected. During this time, the general terminal 4 determined to be present in the vehicle 2 may be registered in the in-vehicle terminal list. When the vehicle program is installed in the portable terminal 50 determined to be present in the vehicle 2 (step ST15: Y), the setting processor 82 may cause the process to proceed to step ST16.

In step ST16, the setting processor 82 may acquire the administrator identification data 59 recorded in the administrator terminal 3 from the administrator terminal 3 using the vehicle internal communication device 42.

In step ST17, the setting processor 82 may transmit the administrator identification data 59 acquired in step ST16 to the vehicle server 6 through the vehicle external communication device 41, and execute an authentication process in the vehicle server 6.

Figure 9:
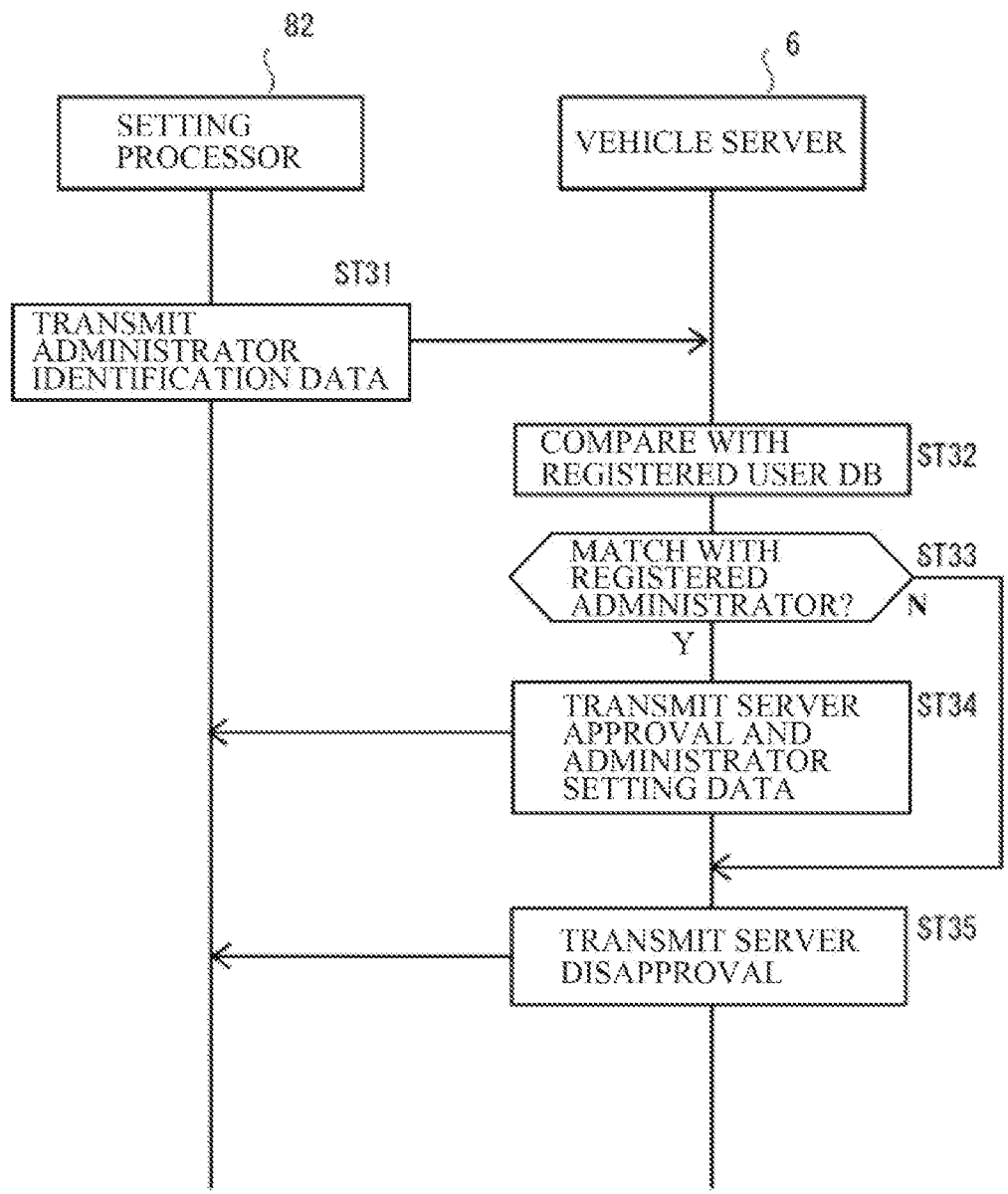
FIG. 9 is a detailed flowchart of a server authentication process in step ST17 of FIG. 8.

FIG. 9 is a detailed flowchart of the server authentication process in step ST17 of FIG. 8.

FIG. 9 illustrates the setting processor 82 and the vehicle server 6. In FIG. 9, time flows from top to bottom.

In step ST31, the setting processor 82 may transmit the administrator identification data 59 acquired in step ST16 of FIG. 8 to the vehicle server 6 through the vehicle external communication device 41.

In step ST32, the vehicle server 6 may compare the administrator identification data 59 received by the server communication device 61 from the setting processor 82 of the vehicle 2 with the administrator identification data 72 of multiple administrators registered in the registered user DB 70 in the server memory 65.

In step ST33, the vehicle server 6 may determine, based on the comparison in step ST32, whether data that matches the administrator identification data 59 received from the vehicle 2 is registered in the registered user DB 70. When the administrator identification data 72 that matches the administrator identification data 59 is registered in the registered user DB 70 (step ST33: Y), the vehicle server 6 may cause the process to proceed to step ST34. When the administrator identification data 72 that matches the administrator identification data 59 is not registered in the registered user DB 70 (step ST33: N), the vehicle server 6 may cause the process to proceed to step ST35.

When the process of step ST34 is to be executed, the data that matches the administrator identification data 59 received from the vehicle 2 may be registered in the registered user DB 70 of the vehicle server 6. This may indicate that the administrator terminal 3 brought into the vehicle 2 is approved by the vehicle server 6. In this case, the vehicle server 6 may transmit, through the server communication device 61, data indicating approval of the administrator identification data 59 and the administrator data 71 associated with the approved administrator identification data 59 in the registered user DB 70. The vehicle external communication device 41 of the vehicle 2 may receive an authentication result of the approval and the administrator data 71 from the vehicle server 6. The administrator data 71 may include the administrator setting data and the individual setting data registered in advance. The administrator data 71 may include multiple pieces of individual setting data. The administrator setting data may be setting data regarding the administrator terminal 3 that is recorded in advance and include setting data regarding the external communication of the administrator terminal 3. The individual setting data may be setting data for each general terminal 4 that is recorded in advance and include setting data regarding the external communication of the general terminal 4. The portable terminal 50 corresponding to any of these pieces of data may be an approved terminal that has been approved by the vehicle server 6.

In contrast, when the vehicle server 6 executes the process of step ST35, the data that matches the administrator identification data 59 received from the vehicle 2 may not be registered in the registered user DB 70. This may indicate that the administrator terminal 3 brought into the vehicle 2 is not approved by the vehicle server 6. In this case, the vehicle server 6 may transmit data indicating disapproval of the administrator identification data 59 through the server communication device 61. The vehicle external communication device 41 of the vehicle 2 may receive an authentication result of the disapproval from the vehicle server 6.

Through the above-described server authentication process, the setting processor 82 may acquire, through the vehicle external communication device 41, the authentication result of the approval or the authentication result of the disapproval regarding the administrator identification data 59 transmitted to the vehicle server 6.

A description will be given referring back to FIG. 8.

In step ST18, the setting processor 82 may determine whether the administrator identification data 59 acquired in step ST16 is approved by the vehicle server 6. When the vehicle server 6 has not approved (step ST18: N), the setting processor 82 may end the control. When the vehicle server 6 has approved (step ST18: Y), the setting processor 82 may cause the process to proceed to step ST19.

In step ST19, the setting processor 82 may compare the in-vehicle terminal list with the administrator data 71 acquired from the vehicle server 6, and determine whether the in-vehicle terminal list includes an unregistered portable terminal 50 the data of which is not included in the administrator data 71. For example, the general terminal 4 brought into the vehicle 2 for the first time is generally not registered in the administrator data 71 acquired from the vehicle server 6. When there is the unregistered portable terminal 50 (step ST19: Y), the setting processor 82 may cause the process to proceed to step ST20. When there is no unregistered portable terminal 50 (step ST19: N), the setting processor 82 may cause the process to proceed to step ST23.

In step ST20, the setting processor 82 may output a list of unregistered portable terminals 50 to the vehicle touch panel device 26. As a result, it is possible for the administrator on the vehicle 2 to recognize that the unregistered portable terminal 50 is present based on the display of the list on the vehicle touch panel device 26. Further, it is possible for the administrator to perform an approval operation that enables the external communication of the unregistered portable terminal 50 on the list displayed on the vehicle touch panel device 26.

In step ST21, the setting processor 82 may determine whether the administrator has performed the approval operation on the vehicle touch panel device 26, which is a user interface. When the administrator has performed the approval operation (step ST21: Y), the setting processor 82 may cause the process to proceed to step ST22. When the administrator has not performed the approval operation (step ST21: N), the setting processor 82 may cause the process to proceed to step ST23.

In step ST22, the setting processor 82 may add the general terminal 4 for which the administrator has performed the approval operation as the approved terminal the external communication of which is to be enabled individually for each portable terminal 50. In this case, in addition to the administrator terminal 3 included in the administrator data 71 and the general terminal 4 included in the administrator data 71, the general terminal 4 approved by the vehicle touch panel device 26 in the in-vehicle terminal list is added to the approved terminal.

In step ST23, the setting processor 82 may make, on the vehicle external communication control processor 81, a setting that enables the external communication of the approved terminal individually for each approved terminal.

For example, for the administrator terminal 3, the setting processor 82 may enable the external communication and make a setting of the external communication, based on the administrator setting data. In the case of the first administrator in FIG. 6, for the administrator terminal 3 used by the first administrator, the setting processor 82 may set the filtering off to make, on the vehicle external communication control processor 81, an enabling setting of the external communication without the access restriction.

For example, for the general terminal 4 that is the approved terminal, the setting processor 82 may enable the external communication, and make a setting of the external communication, based on the individual setting data. In the case of the first user in FIG. 6, for the first terminal used by the first user, the setting processor 82 may set the filtering off to make, on the vehicle external communication control processor 81, an enabling setting of the external communication without the access restriction. In contrast, in the case of the second user, for the second terminal used by the second user, the setting processor 82 may set the filtering on to make, on the vehicle external communication control processor 81, an enabling setting of the external communication with the access restriction.

As described above, the setting processor 82 may make, on the vehicle external communication control processor 81 in which the external communication is disabled, the communication setting for the external communication of the approved terminal individually for each approved terminal, using the setting data of each approved terminal acquired from the vehicle server 6. The setting processor 82 may enable the external communication of the approved terminal through the vehicle 2 individually for each approved terminal, and set the access restriction individually for each approved terminal. The vehicle external communication control processor 81 may start communication control for the external communication individually for each approved terminal by enabling the external communication individually for each approved terminal. It is possible for the portable terminal 50 brought into the vehicle 2 to, for example, establish external communication with the service server 7 through the vehicle 2 under an individual setting for each portable terminal 50.

Further, when no special communication setting operation is performed for the external communication of the unregistered portable terminal 50, the setting processor 82 may temporarily use the individual setting data for another approved general terminal 4 to make the setting of the external communication regarding the unregistered portable terminal 50.

In step ST24, the setting processor 82 may determine whether the administrator data 71 acquired from the vehicle server 6 includes the individual setting data regarding the user of the portable terminal 50. The administrator data 71 associated with the first administrator in FIG. 6 may include the setting data of the seat 11 and the setting data of the individual air conditioner 27. In this case, the setting processor 82 may determine that the administrator data 71 includes the individual setting data regarding the user of the portable terminal 50 (step ST24: Y), and cause the process to proceed to step ST25. When the individual setting data regarding the user of the portable terminal 50 is not included in the administrator data 71 (step ST24: N), the setting processor 82 may end the control.

In step ST25, the setting processor 82 may make a setting on the vehicle 2 using the setting data regarding the user of the portable terminal 50 acquired from the vehicle server 6.

For example, the setting processor 82 may output the setting data of the seat 11 regarding the user of the portable terminal 50 to the individual seat adjuster 28 of the seat 11 on which the user is seated. This makes it possible to adjust, for example, the position of the seat 11 on which the user of the portable terminal 50 is seated in accordance with the setting data.

Additionally, for example, the setting processor 82 may output the setting data of the individual air conditioner 27 regarding the user of the portable terminal 50 to the individual air conditioner 27 for the seat 11 on which the user is seated. As a result, the air conditioning of the seat 11 on which the user of the portable terminal 50 is seated may be performed in accordance with the setting data.

Figure 10:
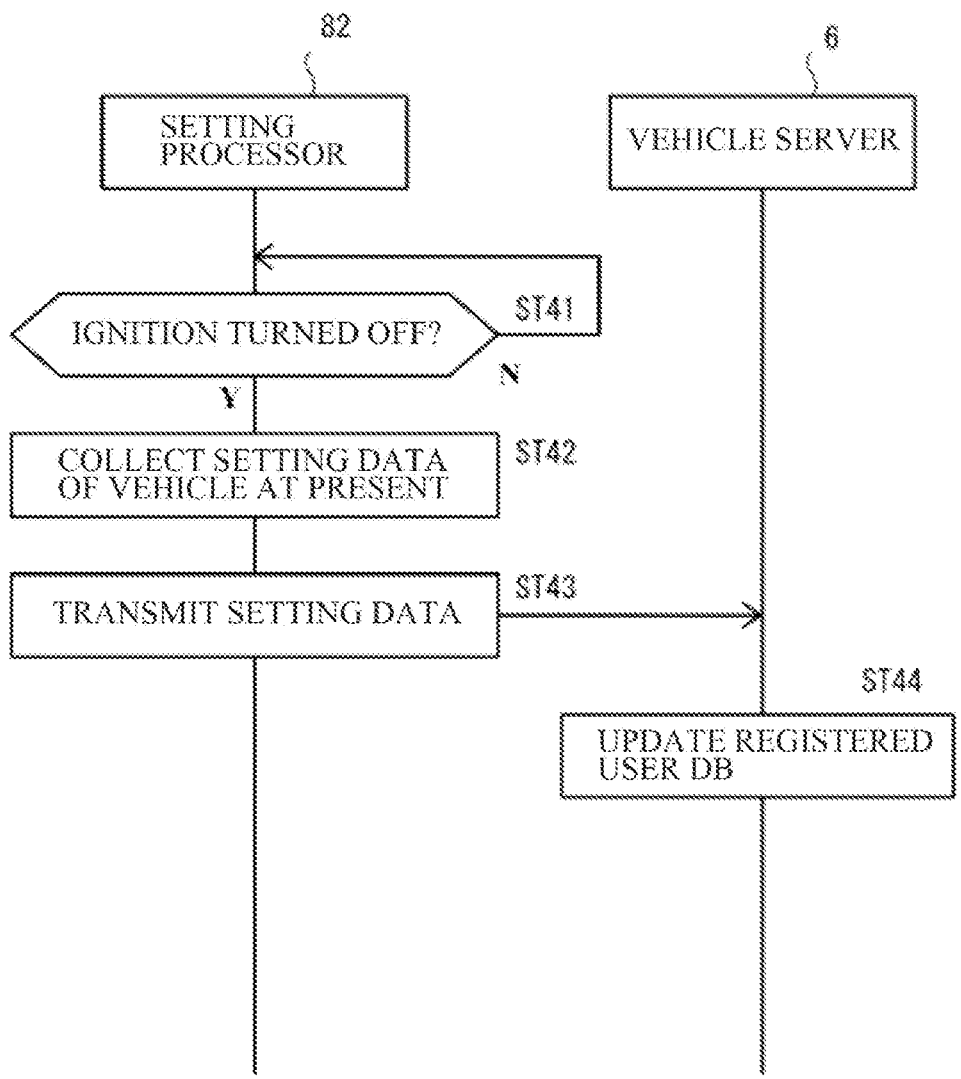
FIG. 10 is a flowchart of exiting control that is performed when an occupant gets off the vehicle and for external communication of the portable terminal, the exiting control being executed by the setting processor in FIG. 7.

FIG. 10 is a flowchart of exiting control performed when the occupant gets off the vehicle 2 and for the external communication of the portable terminal 50. The exiting control may be executed by the setting processor 82 in FIG. 7.

The CPU 34 of the vehicle communication control device 24 in FIG. 2 may execute, as the setting processor 82, the exiting control for the external communication illustrated in FIG. 10.

In step ST41, the setting processor 82 may determine whether the ignition switch 23 is turned off by the occupant such as the administrator. When the ignition switch 23 is not turned off (step ST41: N), the setting processor 82 may repeat the process. When the ignition switch 23 is turned off (step ST41: Y), the setting processor 82 may cause the process to proceed to step ST42.

In step ST42, the setting processor 82 may collect the setting data of the vehicle 2 at present. The setting processor 82 may acquire at least the setting data at present on the vehicle external communication control processor 81 for the external communication of each portable terminal 50. Additionally, for example, the setting processor 82 may acquire the setting data at present regarding the individual seat adjuster 28 and the individual air conditioner 27. These pieces of setting data may correspond to the administrator setting data and the individual setting data in the registered user DB 70.

In step ST43, the setting processor 82 may transmit the setting data at the time of getting off the vehicle 2 collected in step ST42 through the vehicle external communication device 41.

In step ST44, the vehicle server 6 may update the administrator setting data and the individual setting data in the registered user DB 70 with the setting data at the time of getting off the vehicle 2 received through the server communication device 61. This makes it possible to update the administrator setting data and the individual setting data in the registered user DB 70 recorded in the server memory 65 using latest setting data set in the vehicle 2. When the vehicle 2 is used next time, it is possible for the vehicle server 6 to transmit the setting data of the vehicle 2 at the time when the vehicle 2 was used previously as the administrator setting data or the individual setting data. For example, when the administrator makes the setting of the external communication once for a certain general terminal 4 in the vehicle 2, the administrator is not to make the setting again when getting on the vehicle 2 next time.

As described above, in the example embodiment, the vehicle external communication control processor 81 is provided in the vehicle 2 and controls the external communication of the portable terminal 50 through the vehicle 2 using the vehicle internal communication device 42 and the vehicle external communication device 41. The vehicle external communication control processor 81 is activated in a disabled setting state in which the portable terminal 50 is unable to communicate with an external device through the vehicle 2. Additionally, the setting processor 82 makes, on the vehicle 2 including the vehicle external communication control processor 81, the communication setting for the external communication of the portable terminal 50 of the occupant other than the administrator of the vehicle 2 through the vehicle 2. The setting processor 82 determines whether the portable terminal 50 communicable with the vehicle internal communication device 42 is present in the vehicle 2. Upon detecting the portable terminal 50 present in the vehicle 2 through the vehicle internal communication device 42, the setting processor 82 acquires the setting data for each portable terminal 50 recorded in advance regarding the external communication of the portable terminal 50 from the vehicle server 6 using the vehicle external communication device 41. The setting processor 82 makes, on the vehicle external communication control processor 81, the communication setting for the external communication of the portable terminal 50 individually for each portable terminal 50 using the setting data for each portable terminal 50 acquired from the vehicle server 6. This makes it possible for each portable terminal 50 to communicate with an external device through the vehicle 2 in accordance with the communication setting made individually for each terminal.

As described above, in the example embodiment, the external communication of the portable terminal 50 through the vehicle 2 becomes available under the setting of each portable terminal 50. In contrast, if, for example, the vehicle external communication control processor 81 reads the setting data on the external communication of the portable terminal 50 through the vehicle 2 set in advance in the vehicle 2 and is activated, there is a possibility that each portable terminal 50 is allowed to communicate with an external device through the vehicle 2 without the restriction until the communication setting for each portable terminal 50 is enabled thereafter. In the example embodiment, the vehicle external communication control processor 81 is activated in a disabled setting state in which the portable terminal 50 is unable to communicate with an external device through the vehicle 2. The setting data for each portable terminal 50 is recorded in the server memory 65 of the vehicle server 6 separate from the vehicle 2. The vehicle external communication control processor 81 of the example embodiment individually enables the external communication of each portable terminal 50 through the vehicle 2 after acquiring the setting data from the vehicle server 6 and setting the acquired setting data to individually allow the external communication of each portable terminal 50. As a result, the example embodiment helps to prevent occurrence of a situation in which each portable terminal 50 is allowed to communicate with an external device through the vehicle 2 without being restricted.

According to the example embodiment, it is possible to make the external communication of the portable terminal 50 present in the vehicle 2 available under the intention of, for example, the administrator. According to the example embodiment, it is possible to achieve both the convenience of the administrator and the convenience of other occupants at a high level.

In some embodiments, the setting data acquired from the vehicle server 6 may include the setting data on the access restriction regarding the external communication of the portable terminal 50 through the vehicle 2. In this case, the external communication of the portable terminal 50 may be allowed under the access restriction acquired from the vehicle server 6. For example, the portable terminal 50 of the child brought into the vehicle 2 may be allowed to communicate with the setting of the access restriction. The administrator of the vehicle 2 is not to make, on the vehicle 2, the setting of the access restriction regarding the portable terminal 50 of the child each time the portable terminal 50 used by the child is brought into the vehicle 2.

In some embodiments, the server memory 65 of the vehicle server 6 may record the administrator setting data regarding the external communication of the administrator terminal 3 of the administrator and the individual setting data regarding the external communication of the general terminal 4 of the occupant of the vehicle 2 other than the administrator in association with the administrator identification data 72 regarding the administrator such as the driver of the vehicle 2. The setting processor 82 may acquire, from the vehicle server 6, the administrator setting data and the individual setting data associated with the administrator identification data 59 acquired from the administrator terminal 3, and make the communication setting for the external communication individually for each portable terminal 50. As a result, it is possible to make the individual setting for the external communication regarding the general terminal 4 used by the occupant other than the administrator individually for each portable terminal 50, based on the setting recorded in the vehicle server 6, under the intention of the administrator. It is possible for the general terminal 4 used by the occupant other than the administrator to communicate with an external device under the individual setting for the external communication even if the occupant who is the user of the general terminal 4 is not recorded as the administrator in the vehicle server 6.

In some embodiments, the vehicle 2 may include the user interface operable by the occupant of the vehicle 2. The setting processor 82 may determine whether the setting data of the portable terminal 50 detected by the vehicle internal communication device 42 is included in the setting data for each portable terminal 50 acquired from the vehicle server 6. When the setting data is not included, the setting processor 82 may make, on the vehicle external communication control processor 81 provided in the vehicle 2, the setting of the external communication through the vehicle 2 regarding the portable terminal 50 using, for example, the administrator setting data in accordance with operation on the user interface. Further, the setting processor 82 may transmit the setting data inputted to the user interface to the vehicle server 6, and additionally record the setting data in the server memory 65.

Accordingly, in some embodiments, it is possible even for the portable terminal 50 the setting data of which is not recorded in advance in the server memory 65 of the vehicle server 6 to communicate with an external device through the vehicle 2 using the individual setting.

In some embodiments, the server memory 65 of the vehicle server 6 may include the setting data of the vehicle 2 regarding the user of the portable terminal 50. The setting processor 82 may make the setting on the vehicle 2 using the setting data of the vehicle 2 acquired from the vehicle server 6. As a result, the occupant who uses the portable terminal 50 may be automatically allowed to communicate with an external device using the portable terminal 50 and to use the individual setting made on the vehicle 2 by bringing the portable terminal 50 into the vehicle 2.

Note that, in the example embodiment, the setting processor 82 activates the vehicle external communication control processor 81 in a state in which the external communication of the portable terminal 50 is disabled in step ST11 of the entering control in FIG. 7.

In some embodiments, the setting processor 82 may previously make a setting in the exiting control of FIG. 10 to cause the vehicle external communication control processor 81 to activate in a state in which the external communication of the portable terminal 50 is disabled in a next activation. For example, the vehicle external communication control processor 81 may read the setting data from, for example, a predetermined region of the memory 33 at the time of activation. In this case, the setting processor 82 may update the setting data for the external communication of the portable terminal 50 in the setting data of the vehicle external communication control processor 81 in advance to cause the external communication to be disabled.

Second Example Embodiment

Next, the vehicle external communication control system 1 for the portable terminal 50 in the vehicle 2 according to a second example embodiment of the disclosure will be described. Hereinafter, differences from the above-described example embodiments will be mainly described.

In the above-described example embodiments, the setting processor 82 may execute the authentication process by the vehicle server 6. The authentication process may be executed by detecting the administrator terminal 3 that is brought into the vehicle 2 and present in the vehicle 2 through the vehicle internal communication device 42 in a state in which the external communication of the portable terminal 50 is disabled in the vehicle external communication control processor 81. In this case, the setting processor 82 may be to wait until the vehicle internal communication device 42 detects the administrator terminal 3 before executing the authentication process by the vehicle server 6 for the external communication through the vehicle 2. Even if the occupant other than the administrator brings the general terminal 4 into the vehicle 2, the general terminal 4 may be unable to start the external communication through the vehicle 2 unless the vehicle internal communication device 42 detects the administrator terminal 3 brought into the vehicle 2. In the second example embodiment, when the general terminal 4 of the occupant other than the administrator is brought into the vehicle 2, it may be assumed that it is a situation where the administrator is to bring the administrator terminal 3 into the vehicle 2 thereafter. On this assumption, the external communication of the general terminal 4 may be allowed to be started in response to detection of the administrator terminal 3 in the vicinity of the vehicle 2.

Figure 11:
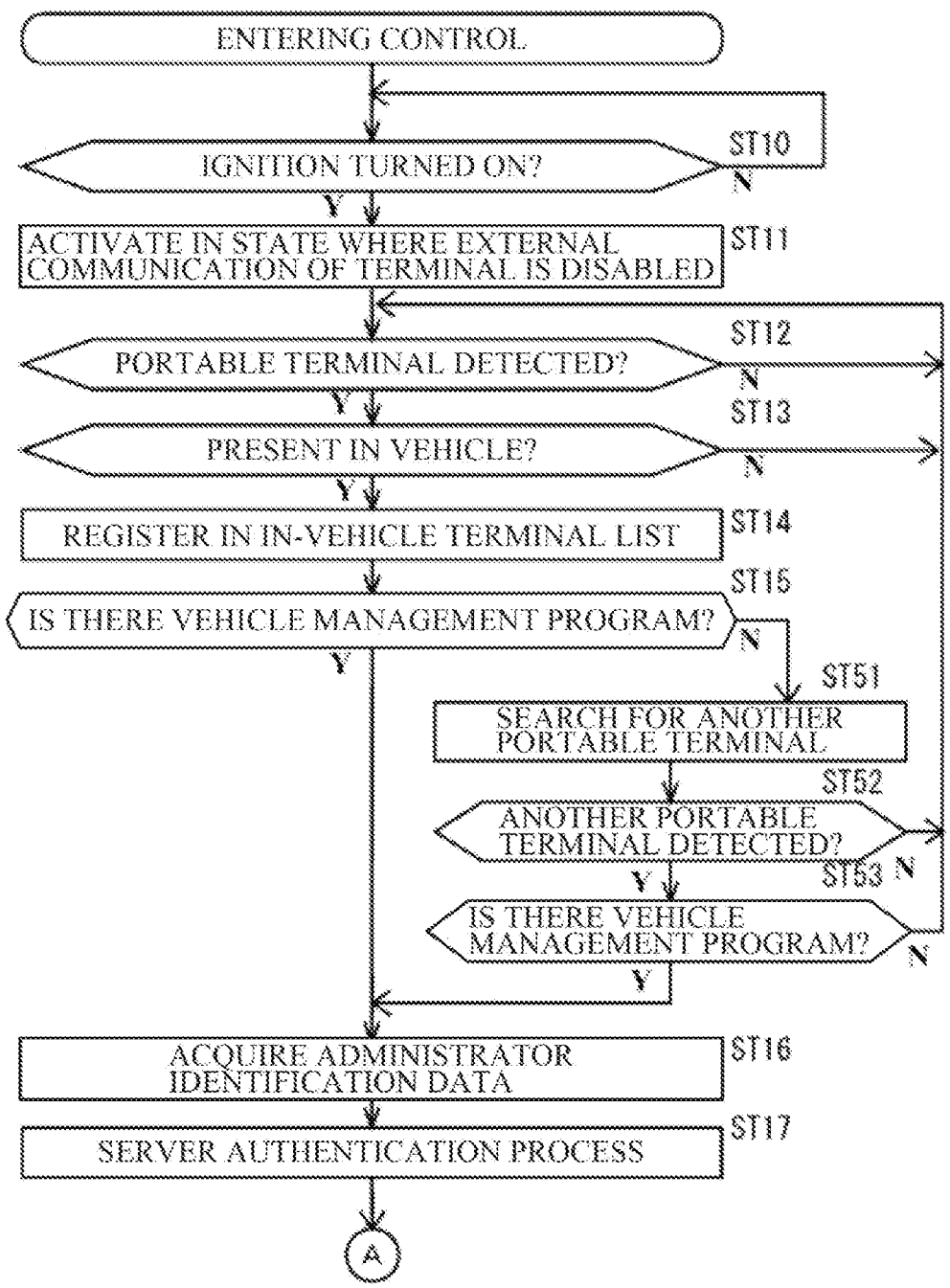
FIG. 11 is a flowchart of entering control that is performed when an occupant gets on the vehicle and for external communication of a portable terminal, the entering control being executed by a setting processor according to one example embodiment of the disclosure.

FIG. 11 is a flowchart of entering control that is performed when the occupant gets on the vehicle 2 and for external communication of the portable terminal 50. The entering control may be executed by the setting processor 82 according to the second example embodiment of the disclosure.

The setting processor 82 of the vehicle 2 may execute the entering control illustrated in FIG. 11 instead of the entering control in FIG. 8. Note that FIG. 11 illustrates a process range corresponding to steps ST10 to ST17 of FIG. 8 due to limitations of space. The coupling point A in FIG. 11 leads to the coupling point A in FIG. 8.

Steps ST10 to ST17 in FIG. 11 are the same as steps ST10 to ST17 in FIG. 8. Note that, however, when it is determined that the vehicle program is not installed in the portable terminal 50 that is determined to be present in the vehicle 2 in step ST15 (step ST15: N), the setting processor 82 may cause the process to proceed to step ST51. For example, when it is determined that the portable terminal 50 determined to be present in the vehicle 2 is not the administrator terminal 3 but the general terminal 4, the setting processor 82 may cause the process to proceed to step ST51.

In step ST51, the setting processor 82 may search for another portable terminal 50 in the vicinity of the vehicle 2 using the vehicle internal communication device 42.

In step ST52, the setting processor 82 may determine whether another portable terminal 50 is detected by the search in step ST51. This makes it possible for the setting processor 82 to, for example, newly detect the portable terminal 50 that is in the vicinity of the vehicle 2 and has not been detected through the vehicle internal communication device 42 yet. When another portable terminal 50 is not detected by the search (step ST52: N), the setting processor 82 may cause the process to return to step ST12. When another portable terminal 50 is detected by the search (step ST52: Y), the setting processor 82 may cause the process to proceed to step ST53.

In step ST53, the setting processor 82 may determine whether the portable terminal 50 that is newly detected by the search in step ST51 is the administrator terminal 3. The setting processor 82 may communicate with the portable terminal 50 that has been newly detected by the search using the vehicle internal communication device 42, and determine whether the vehicle program is installed in the portable terminal 50. When the vehicle program is not installed in the portable terminal 50 that has been newly detected by the search (step ST53: N), the setting processor 82 may cause the process to return to step ST12. When the vehicle program is installed in the portable terminal 50 that has been newly detected by the search (step ST53: Y), the setting processor 82 may cause the process to proceed to step ST16.

As described above, in the second example embodiment, when the general terminal 4 in which no administrator identification data 59 is recorded is detected by the vehicle internal communication device 42, the setting processor 82 may search for the administrator terminal 3 in which the administrator identification data 59 is recorded using the vehicle internal communication device 42. When the administrator terminal 3 in the vicinity of the vehicle 2 is detected by the search, the setting processor 82 may acquire the administrator identification data 59 recorded in the administrator terminal 3 from the administrator terminal 3 using the vehicle internal communication device 42, and further acquire the administrator setting data and the individual setting data from the vehicle server 6 and set the administrator setting data and the individual setting data that have been acquired. As a result, in response to the detection of the general terminal 4 in the vehicle 2 by the vehicle internal communication device 42, it is possible for the setting processor 82 to search for the administrator terminal 3 that is in the vicinity of the vehicle 2 and has not been detected by the internal communication device 42, and make the communication setting for the general terminal 4. This makes it possible for the setting processor 82 to make the communication setting for the general terminal 4 after the general terminal 4 is detected to be present in the vehicle 2 by the vehicle internal communication device 42 without waiting for the administrator terminal 3 to be detected in the vehicle 2 by the vehicle internal communication device 42.

Third Example Embodiment

Next, the vehicle external communication control system 1 for the portable terminal 50 in the vehicle 2 according to a third example embodiment of the disclosure will be described. Hereinafter, differences from the above-described example embodiments will be mainly described.

In the above-described example embodiments, when the occupant gets on the vehicle 2, the setting processor 82 may detect the administrator terminal 3 by the vehicle internal communication device 42 in a state in which the external communication of the portable terminal 50 is disabled in the vehicle external communication control processor 81. Thereafter, the setting processor 82 may enable the external communication through the vehicle 2 individually for each portable terminal 50. The external communication of each portable terminal 50 may be enabled until the occupant gets off the vehicle 2.

However, in the vehicle 2, an emergency situation such as a contact prediction, a contact detection, or a driver anomaly may possibly occur. The emergency situation determiner 30 may be a device that determines an emergency situation in the vehicle 2. The emergency situation of the vehicle 2 may include, for example, a contact prediction, a contact detection, and a driver anomaly. The emergency situation determiner 30 may monitor occurrence of these conditions. When an emergency situation occurs, the emergency situation determiner 30 may output data on an emergency notification to the vehicle network 29 and cause the data to be transmitted to, for example, the vehicle server 6 through the vehicle external communication device 41.

The vehicle external communication device 41 may be used to transmit and receive data such as an emergency notification when an emergency situation occurs as described above. At this time, for example, when there is high-load external communication for multiple general terminals 4, there is a possibility that the vehicle external communication device 41 transmits and receives the data for the emergency situation with a delay due to processing of the high-load external communication. The third example embodiment is intended to make it difficult to cause such a delay of data for an emergency situation.

Figure 12:
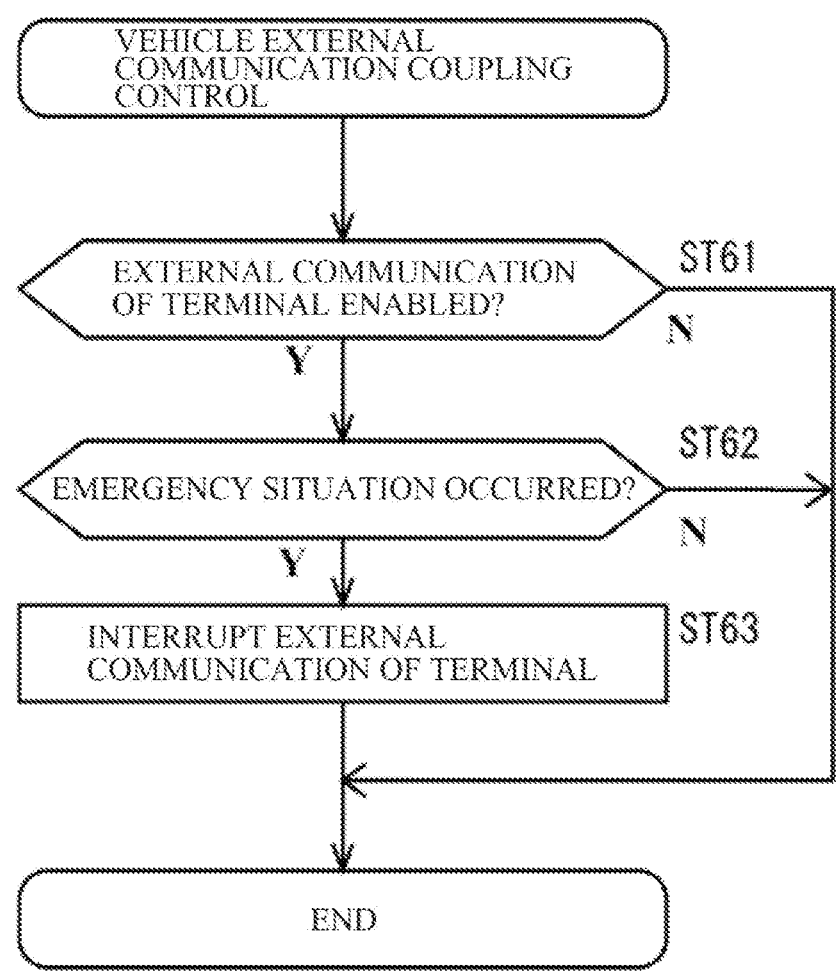
FIG. 12 is a flowchart of coupling control that is performed during external communication of a portable terminal by a setting processor according to one example embodiment of the disclosure.

FIG. 12 is a flowchart of coupling control for the external communication of the portable terminal 50 performed by the setting processor 82 according to the third example embodiment of the disclosure.

When the external communication of the portable terminal 50 is enabled, the setting processor 82 may repeatedly execute the coupling control illustrated in FIG. 12.

In step ST61, the setting processor 82 may determine whether the external communication of the portable terminal 50 is enabled. When, for example, the administrator terminal 3 is detected in the entering control in FIG. 8 or FIG. 11, the setting processor 82 may set, in the vehicle external communication control processor 81, the administrator data 71 acquired from the vehicle server 6, and enable the external communication of each portable terminal 50 individually. In this case, the setting processor 82 may determine that the external communication of the portable terminal 50 is enabled (step ST61: Y), and cause the process to proceed to step ST62. In contrast, when the external communication of the portable terminal 50 is disabled in the vehicle external communication control processor 81 (step ST61: N), the setting processor 82 may determine that the external communication of the portable terminal 50 is not enabled, and end the control.

In step ST62, the setting processor 82 may determine whether an emergency situation has occurred in the vehicle 2. When the emergency situation determiner 30 determines that an emergency situation has occurred, the setting processor 82 may determine that an emergency situation has occurred in the vehicle 2 (step ST62: Y), and cause the process to proceed to step ST63. In contrast, when the emergency situation determiner 30 has not determined that an emergency situation has occurred, the setting processor 82 may determine that an emergency situation has not occurred in the vehicle 2 (step ST62: N), and end the control.

In step ST63, the setting processor 82 may disable the external communication of all the portable terminals 50 in the vehicle external communication control processor 81. As a result, the vehicle external communication device 41 may stop executing the process for the external communication of the portable terminals 50. This makes it possible for the vehicle external communication device 41 to transmit data for the emergency situation to, for example, the vehicle server 6 without a significant delay.

As described above, in the third example embodiment, the vehicle 2 may include the emergency situation determiner 30. Upon determining the occurrence of an emergency situation such as a contact prediction or a contact detection of the vehicle 2, or an occupant anomaly, the emergency situation determiner 30 may make an emergency notification using the vehicle external communication device 41. When the emergency situation determiner 30 determines that an emergency situation has occurred after the setting processor 82 makes, on the vehicle external communication control processor 81, the communication setting for the external communication of the portable terminal 50, the setting processor 82 may update the communication setting on the vehicle external communication control processor 81 to cause the portable terminal 50 to be unable to communicate with an external device through the vehicle 2. Thus, for example, even during high-load communication of the portable terminal 50 that is present in the vehicle 2 such as a case when communicating video, it is possible to disable and stop the communication, and to make the emergency notification that is made using the vehicle external communication device 41 to be less likely to be affected by the external communication of the portable terminal 50. It is possible to transmit the emergency notification without delay, for example.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the above-described example embodiments, the setting processor 82 may start the entering control in response to the ignition switch 23 being turned on to enable the vehicle 2 to travel.

In some embodiments, the setting processor 82 may start the entering control in response to the seating sensor 22 detecting that an occupant has seated on any of the seats 11 in the vehicle 2.

In some embodiments, the setting processor 82 may start the entering control in response to the door opening and closing sensor 21 detecting that any door of the vehicle 2 has been opened and closed.

When any of the modifications illustrated here is combined with, for example, the second example embodiment, the general terminal 4 brought into the vehicle 2 may be allowed to communicate with an external device through the vehicle 2 before the administrator turns on the ignition switch 23 of the vehicle 2 by bringing the general terminal 4 into the vehicle 2.

As used herein, the term "collision" may be used interchangeably with the term "contact".

Each of the vehicle external communication control processor 81 and the setting processor 82 illustrated in FIG. 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the vehicle external communication control processor 81 and the setting processor 82. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the vehicle external communication control processor 81 and the setting processor 82 illustrated in FIG. 7.

The invention claimed is:

1. A vehicle external communication control system for one or more terminals in a vehicle, the vehicle external communication control system being configured to control external communication of the one or more terminals through the vehicle, the vehicle external communication control system comprising:
   a vehicle internal communicator disposed in the vehicle and communicable with the one or more terminals present in the vehicle;
   a vehicle external communicator disposed in the vehicle and communicable with an external device outside the vehicle;
   a vehicle external communication controller disposed in the vehicle and configured to control the external communication of the one or more terminals through the vehicle using the vehicle internal communicator and the vehicle external communicator;
   a setter disposed in the vehicle and configured to make, on the vehicle external communication controller, a communication setting for the external communication of the one or more terminals through the vehicle; and
   a server comprising a server memory configured to record setting data regarding the external communication of the one or more terminals on an individual terminal basis, the server being communicable with the vehicle external communicator of the vehicle, wherein
   the vehicle external communication controller is configured to be activated in a setting state in which the one or more terminals are unable to communicate with the external device through the vehicle, and
   the setter is configured to:
      determine whether the one or more terminals communicable with the vehicle internal communicator are present in the vehicle, and
      upon detecting the one or more terminals present in the vehicle through the vehicle internal communicator, acquire the setting data regarding the external communication of the one or more terminals recorded on the individual terminal basis from the server through the vehicle external communicator, and make, on the vehicle external communication controller, the communication setting for the external communication of the one or more terminals on the individual terminal basis using the setting data recorded on the individual terminal basis acquired from the server and control the external communication of the one or more terminals through the vehicle on the individual terminal basis.

2. The vehicle external communication control system for the one or more terminals in the vehicle according to claim 1, wherein
the one or more terminals comprise an administrator terminal carried by an administrator of the vehicle, and a general terminal carried by an occupant of the vehicle other than the administrator,
the server memory of the server is configured to record administrator setting data regarding external communication of the administrator terminal and individual setting data regarding external communication of the general terminal in association with administrator identification data regarding the administrator, and
the setter is configured to,
when a terminal is detected by the vehicle internal communicator, determine whether the detected terminal is the administrator terminal in which the administrator identification data is recorded, and
when the detected terminal is the administrator terminal in which the administrator identification data is recorded,
acquire the administrator identification data recorded in the administrator terminal from the administrator terminal detected by the vehicle internal communicator,
acquire, from the server, the administrator setting data and the individual setting data associated in the server memory of the server with the administrator identification data acquired from the administrator terminal through communication between the vehicle external communicator and the server, and
make, on the vehicle external communication controller, the communication setting for the external communication of the one or more terminals on the individual terminal basis by making a communication setting for the external communication of the administrator terminal using the administrator setting data acquired from the server and by making a communication setting for the external communication of the general terminal using the individual setting data acquired from the server.

3. The vehicle external communication control system for the one or more terminals in the vehicle according to claim 2, wherein the setter is configured to,
when the general terminal in which no administrator identification data is recorded is detected by the vehicle internal communicator,
search for the administrator terminal in which the administrator identification data is recorded using the vehicle internal communicator,
acquire the administrator identification data recorded in the administrator terminal from the administrator terminal using the vehicle internal communicator when the administrator terminal in which the administrator identification data is recorded is detected by the search,
acquire, from the server, the administrator setting data and the individual setting data associated in the server memory of the server with the administrator identification data acquired from the administrator terminal through the communication between the vehicle external communicator and the server, and
make, on the vehicle external communication controller, the communication setting for the external communication of the one or more terminals on the individual terminal basis by making the communication setting for the external communication of the administrator terminal using the administrator setting data acquired from the server and by making the communication setting for the external communication of the general terminal using the individual setting data acquired from the server.

4. The vehicle external communication control system for the one or more terminals in the vehicle according to claim 2, further comprising a user interface disposed in the vehicle and operable by an occupant of the vehicle, wherein
the setter is configured to:
record the general terminal in an in-vehicle terminal list when the general terminal in which no administrator identification data is recorded is detected by the vehicle internal communicator,
determine whether the setting data of the general terminal recorded in the in-vehicle terminal list is comprised in the setting data on the individual terminal basis acquired from the server, and
when the setting data of the general terminal recorded in the in-vehicle terminal list is not comprised in the setting data acquired from the server, make, on the vehicle external communication controller, the communication setting for the external communication through the vehicle regarding the general terminal the setting data of which is not comprised in the setting data acquired from the server in accordance with operation on the user interface.

5. The vehicle external communication control system for the one or more terminals in the vehicle according to claim 3, further comprising a user interface disposed in the vehicle and operable by an occupant of the vehicle, wherein
the setter is configured to:
record the general terminal in an in-vehicle terminal list when the general terminal in which no administrator identification data is recorded is detected by the vehicle internal communicator,
determine whether the setting data of the general terminal recorded in the in-vehicle terminal list is comprised in the setting data on the individual terminal basis acquired from the server, and
when the setting data of the general terminal recorded in the in-vehicle terminal list is not comprised in the setting data acquired from the server, make, on the vehicle external communication controller, the communication setting for the external communication through the vehicle regarding the general terminal the setting data of which is not comprised in the setting data acquired from the server in accordance with operation on the user interface.

6. The vehicle external communication control system for the one or more terminals in the vehicle according to claim 4, wherein, when the setting data acquired from the server comprises setting data on an access restriction regarding the external communication of the one or more terminals through the vehicle, the setter is configured to set, on the vehicle external communication controller, the access restriction regarding the external communication of the one or more terminals using the setting data on the access restriction acquired from the server.

7. The vehicle external communication control system for the one or more terminals in the vehicle according to claim 5, wherein, when the setting data acquired from the server comprises setting data on an access restriction regarding the external communication of the one or more terminals through the vehicle, the setter is configured to set, on the vehicle external communication controller, the access restriction regarding the external communication of the one or more terminals using the setting data on the access restriction acquired from the server.

8. The vehicle external communication control system for the one or more terminals in the vehicle according to claim 6, wherein
the setter is configured to make a setting on the vehicle comprising the vehicle external communication controller, and
when setting data of the vehicle regarding the occupant using the one or more terminals is acquired from the server together with the setting data regarding the external communication of the one or more terminals on the individual terminal basis, the setter is configured to make the setting on the vehicle using the setting data of the vehicle regarding the occupant acquired from the server.

9. The vehicle external communication control system for the one or more terminals in the vehicle according to claim 7, wherein
the setter is configured to make a setting on the vehicle comprising the vehicle external communication controller, and
when setting data of the vehicle regarding the occupant using the one or more terminals is acquired from the server together with the setting data regarding the external communication of the one or more terminals on the individual terminal basis, the setter is configured to make the setting on the vehicle using the setting data of the vehicle regarding the occupant acquired from the server.

10. The vehicle external communication control system for the one or more terminals in the vehicle according to claim 8, further comprising an emergency situation determiner disposed in the vehicle, the emergency situation determiner being configured to determine occurrence of an emergency situation of the vehicle and make an emergency notification using the vehicle external communicator, wherein
the setter is configured to update the communication setting on the vehicle external communication controller and disable the external communication of the one or more terminals through the vehicle when the emergency situation determiner determines that an emergency situation has occurred after the setter makes, on the vehicle external communication controller, the communication setting for the external communication of the one or more terminals.

11. The vehicle external communication control system for the one or more terminals in the vehicle according to claim 9, further comprising an emergency situation determiner disposed in the vehicle, the emergency situation determiner being configured to determine occurrence of an emergency situation of the vehicle and make an emergency notification using the vehicle external communicator, wherein
the setter is configured to update the communication setting on the vehicle external communication controller and disable the external communication of the one or more terminals through the vehicle when the emergency situation determiner determines that an emergency situation has occurred after the setter makes, on the vehicle external communication controller, the communication setting for the external communication of the one or more terminals.

12. A vehicle external communication control system for one or more terminals in a vehicle, the vehicle external communication control system being configured to control external communication of the one or more terminals through the vehicle, the vehicle external communication control system comprising:
a vehicle internal communicator disposed in the vehicle and communicable with the one or more terminals present in the vehicle;
a vehicle external communicator disposed in the vehicle and communicable with an external device outside the vehicle;
a server comprising a server memory configured to record setting data regarding the external communication of the one or more terminals on an individual terminal basis, the server being communicable with the vehicle external communicator of the vehicle; and
circuitry configured to:
control the external communication of the one or more terminals through the vehicle using the vehicle internal communicator and the vehicle external communicator,
make a communication setting for the external communication of the one or more terminals through the vehicle,
be activated in a setting state in which the one or more terminals are unable to communicate with the external device through the vehicle,
determine whether the one or more terminals communicable with the vehicle internal communicator are present in the vehicle, and
upon detecting the one or more terminals present in the vehicle through the vehicle internal communicator,
acquire the setting data regarding the external communication of the one or more terminals recorded on the individual terminal basis from the server through the vehicle external communicator, and
make the communication setting for the external communication of the one or more terminals on the individual terminal basis using the setting data recorded on the individual terminal basis acquired from the server to control the external communication of the one or more terminals through the vehicle on the individual terminal basis.

* * * * *